United States Patent
Richley et al.

(10) Patent No.: US 10,212,262 B2
(45) Date of Patent: *Feb. 19, 2019

(54) MODULAR LOCATION TAG FOR A REAL TIME LOCATION SYSTEM NETWORK

(71) Applicant: Zebra Technologies Corporation, Lincolnshire, IL (US)

(72) Inventors: Edward A. Richley, Gaithersburg, MD (US); Belinda Turner, Germantown, MD (US); Aitan Ameti, Rockville, MD (US); Jill Stelfox, San Jose, CA (US); James J. O'Hagan, McHenry, IL (US); Alexander Mueggenborg, Arlington, VA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/609,823

(22) Filed: May 31, 2017

(65) Prior Publication Data

US 2017/0272556 A1    Sep. 21, 2017

Related U.S. Application Data

(63) Continuation of application No. 14/732,360, filed on Jun. 5, 2015, now Pat. No. 9,699,278, which is a (Continued)

(51) Int. Cl.
*H04L 29/08* (2006.01)
*G06K 7/10* (2006.01)
(Continued)

(52) U.S. Cl.
CPC ........ *H04L 69/324* (2013.01); *G06F 17/3087* (2013.01); *G06F 17/30864* (2013.01);
(Continued)

(58) Field of Classification Search
CPC ........ G06K 9/00342; G06K 2017/0045; A61B 5/11; A63B 24/0021; A63B 69/3608;
(Continued)

(56) References Cited

U.S. PATENT DOCUMENTS 3,732,500 A    5/1973    Dishal et al.
4,270,145 A    5/1981    Farina
(Continued)

FOREIGN PATENT DOCUMENTS

EP    1235077 A2    8/2002
EP    1241616 A2    9/2002
(Continued)

OTHER PUBLICATIONS

Marchant, "Secure Animal Identification and Source Verification", JM Communications, UK, 2002.
(Continued)

*Primary Examiner* — Andrew W Bee

(57) ABSTRACT

An example disclosed method includes generating, by a microcontroller of a controller, a data packet; and causing the transmission of the data packet on blink data pulses from two or more individual transmit modules, wherein each individual transmit module is in comprises an antenna and a pulse generator configured to transmit the data packet and is in data communications with the controller, wherein the controller causes substantially simultaneous transmission of the blink data pulses from the respective transmit modules to encourage reliable receipt of the blink data pulses at one or more of a plurality of receivers.

19 Claims, 12 Drawing Sheets

Related U.S. Application Data continuation-in-part of application No. 14/205,216, filed on Mar. 11, 2014, now Pat. No. 9,531,415.

(60) Provisional application No. 61/831,990, filed on Jun. 6, 2013.

(51) Int. Cl.

| | |
|---|---|
| *H04Q 9/14* | (2006.01) |
| *H04L 12/26* | (2006.01) |
| *G06F 17/30* | (2006.01) |
| *G06K 9/00* | (2006.01) |
| *G09B 19/00* | (2006.01) |
| *H04B 1/7097* | (2011.01) |
| *H04B 1/7163* | (2011.01) |
| *H04W 4/02* | (2018.01) |
| *H04Q 9/00* | (2006.01) |
| *G06Q 90/00* | (2006.01) |
| *H04W 4/80* | (2018.01) |
| *H04B 1/719* | (2011.01) |

(52) U.S. Cl.
CPC ..... *G06K 7/10306* (2013.01); *G06K 9/00342* (2013.01); *G09B 19/0038* (2013.01); *H04B 1/7097* (2013.01); *H04B 1/71635* (2013.01); *H04L 43/04* (2013.01); *H04L 67/12* (2013.01); *H04Q 9/00* (2013.01); *H04Q 9/14* (2013.01); *H04W 4/02* (2013.01); *G06Q 90/00* (2013.01); *H04B 1/719* (2013.01); *H04B 1/7163* (2013.01); *H04B 1/71637* (2013.01); *H04Q 2209/47* (2013.01); *H04W 4/80* (2018.02)

(58) Field of Classification Search
CPC .......... A63B 2220/836; A63B 2220/00; A63B 2220/10; A63B 2024/0025; A63B 2225/54
See application file for complete search history.

(56) References Cited

U.S. PATENT DOCUMENTS

| | | | |
|---|---|---|---|
| 5,046,133 A | 9/1991 | Watanabe et al. |
| 5,119,104 A | 6/1992 | Heller |
| 5,469,409 A | 11/1995 | Anderson et al. |
| 5,513,854 A | 5/1996 | Daver |
| 5,645,077 A | 7/1997 | Foxlin |
| 5,699,244 A | 12/1997 | Clark, Jr. et al. |
| 5,793,630 A | 8/1998 | Theimer et al. |
| 5,901,172 A | 5/1999 | Fontana et al. |
| 5,920,287 A | 7/1999 | Belcher et al. |
| 5,930,741 A | 7/1999 | Kramer |
| 5,995,046 A | 11/1999 | Belcher et al. |
| 6,028,626 A | 2/2000 | Aviv |
| 6,121,926 A | 9/2000 | Belcher et al. |
| 6,176,837 B1 | 1/2001 | Foxlin |
| 6,204,813 B1 | 3/2001 | Wadell et al. |
| 6,366,242 B1 | 4/2002 | Boyd et al. |
| 6,380,894 B1 | 4/2002 | Boyd et al. |
| 6,593,885 B2 | 7/2003 | Wisherd et al. |
| 6,655,582 B2 | 12/2003 | Wohl et al. |
| 6,710,713 B1 | 3/2004 | Russo |
| 6,812,884 B2 | 11/2004 | Richley et al. |
| 6,836,744 B1 | 12/2004 | Asphahani et al. |
| 6,882,315 B2 | 4/2005 | Richley et al. |
| 7,009,638 B2 | 3/2006 | Gruber et al. |
| 7,190,271 B2 | 3/2007 | Boyd |
| 7,263,133 B1 | 8/2007 | Miao |
| 7,667,604 B2 | 2/2010 | Ebert et al. |
| 7,671,802 B2 | 3/2010 | Walsh et al. |
| 7,710,322 B1 | 5/2010 | Ameti et al. |
| 7,739,076 B1 | 6/2010 | Vock et al. |
| 7,755,541 B2 | 7/2010 | Wisherd et al. |
| 7,899,006 B2 | 3/2011 | Boyd |
| 7,969,348 B2 | 6/2011 | Baker et al. |
| 8,009,727 B2 | 8/2011 | Hui et al. |
| 8,023,917 B2 | 9/2011 | Popescu |
| 8,077,981 B2 | 12/2011 | Elangovan et al. |
| 8,269,835 B2 | 9/2012 | Grigsby et al. |
| 8,279,051 B2 | 10/2012 | Khan |
| 8,289,185 B2 | 10/2012 | Alonso |
| 8,457,392 B2 | 6/2013 | Cavallaro et al. |
| 8,477,046 B2 | 7/2013 | Alonso |
| 8,568,278 B2 | 10/2013 | Riley et al. |
| 8,665,152 B1 | 3/2014 | Kling et al. |
| 8,696,458 B2 | 4/2014 | Foxlin et al. |
| 8,705,671 B2 | 4/2014 | Ameti et al. |
| 8,775,916 B2 | 7/2014 | Pulsipher et al. |
| 8,780,204 B2 | 7/2014 | DeAngelis et al. |
| 8,795,045 B2 | 8/2014 | Sorrells et al. |
| 8,842,002 B2 | 9/2014 | Rado |
| 8,989,880 B2 | 3/2015 | Wohl et al. |
| 9,081,076 B2 | 7/2015 | DeAngelis et al. |
| 9,185,361 B2 | 11/2015 | Curry |
| 9,381,645 B1 | 7/2016 | Yarlagadda et al. |
| 2001/0010541 A1 | 8/2001 | Fernandez et al. |
| 2001/0030625 A1 | 10/2001 | Doles et al. |
| 2002/0004398 A1 | 1/2002 | Ogino et al. |
| 2002/0041284 A1 | 4/2002 | Konishi et al. |
| 2002/0114493 A1 | 8/2002 | McNitt et al. |
| 2002/0116147 A1 | 8/2002 | Vock et al. |
| 2002/0130835 A1 | 9/2002 | Brosnan |
| 2002/0135479 A1 | 9/2002 | Belcher et al. |
| 2003/0090387 A1 | 5/2003 | Lestienne et al. |
| 2003/0095186 A1 | 5/2003 | Aman et al. |
| 2003/0128100 A1 | 7/2003 | Burkhardt et al. |
| 2003/0163287 A1 | 8/2003 | Vock et al. |
| 2003/0227453 A1 | 12/2003 | Beier et al. |
| 2004/0022227 A1 | 2/2004 | Lynch et al. |
| 2004/0062216 A1 | 4/2004 | Nicholls et al. |
| 2004/0108954 A1 | 6/2004 | Richley et al. |
| 2004/0178960 A1 | 9/2004 | Sun |
| 2004/0249969 A1 | 12/2004 | Price |
| 2004/0260470 A1 | 12/2004 | Rast |
| 2004/0260828 A1 | 12/2004 | Price |
| 2005/0026563 A1 | 2/2005 | Leeper et al. |
| 2005/0031043 A1 | 2/2005 | Paquelet |
| 2005/0059998 A1 | 3/2005 | Norte et al. |
| 2005/0075079 A1 | 4/2005 | Jei et al. |
| 2005/0093976 A1 | 5/2005 | Valleriano et al. |
| 2005/0148281 A1 | 7/2005 | Sanchez-Castro et al. |
| 2005/0207617 A1 | 9/2005 | Sarnoff |
| 2006/0067324 A1 | 3/2006 | Kim et al. |
| 2006/0139167 A1 | 6/2006 | Davie et al. |
| 2006/0164213 A1 | 7/2006 | Burghard et al. |
| 2006/0252476 A1 | 11/2006 | Bahou |
| 2006/0271912 A1 | 11/2006 | Mickle et al. |
| 2006/0281061 A1 | 12/2006 | Hightower et al. |
| 2007/0091292 A1 | 4/2007 | Cho et al. |
| 2007/0176749 A1 | 8/2007 | Boyd |
| 2007/0296723 A1 | 12/2007 | Williams |
| 2008/0065684 A1 | 3/2008 | Zilberman |
| 2008/0106381 A1 | 5/2008 | Adamec et al. |
| 2008/0113787 A1 | 5/2008 | Alderucci et al. |
| 2008/0129825 A1 | 6/2008 | DeAngelis et al. |
| 2008/0140233 A1 | 6/2008 | Seacat |
| 2008/0186231 A1 | 8/2008 | Aljadeff et al. |
| 2008/0204248 A1 | 8/2008 | Cam Winget et al. |
| 2008/0262885 A1 | 10/2008 | Jain et al. |
| 2008/0266131 A1 | 10/2008 | Richardson et al. |
| 2008/0269016 A1 | 10/2008 | Ungari et al. |
| 2008/0281443 A1 | 11/2008 | Rodgers |
| 2008/0285805 A1 | 11/2008 | Luinge et al. |
| 2008/0291024 A1 | 11/2008 | Zhang et al. |
| 2009/0048044 A1 | 2/2009 | Oleson et al. |
| 2009/0141736 A1 | 6/2009 | Becker |
| 2009/0210078 A1 | 8/2009 | Crowley |
| 2009/0231198 A1 | 9/2009 | Walsh et al. |
| 2010/0026809 A1 | 2/2010 | Curry |
| 2010/0045508 A1 | 2/2010 | Ekbal et al. |
| 2010/0054304 A1 | 3/2010 | Barnes et al. |
| 2010/0060452 A1 | 3/2010 | Schuster et al. |

(56) References Cited

U.S. PATENT DOCUMENTS

| | | |
|---|---|---|
| 2010/0117837 A1 | 5/2010 | Stirling et al. |
| 2010/0150117 A1 | 6/2010 | Aweya et al. |
| 2010/0228314 A1 | 9/2010 | Goetz |
| 2010/0250305 A1 | 9/2010 | Lee et al. |
| 2010/0278386 A1 | 11/2010 | Hoeflinger |
| 2010/0283630 A1 | 11/2010 | Alonso |
| 2010/0328073 A1 | 12/2010 | Nikitin et al. |
| 2011/0002223 A1 | 1/2011 | Gross |
| 2011/0025847 A1 | 2/2011 | Park et al. |
| 2011/0054782 A1 | 3/2011 | Kaahui |
| 2011/0063114 A1 | 3/2011 | Ikoyan |
| 2011/0064023 A1 | 3/2011 | Yamamoto et al. |
| 2011/0084806 A1 | 4/2011 | Perkins |
| 2011/0132378 A1 | 6/2011 | Levendowski et al. |
| 2011/0134240 A1 | 6/2011 | Anderson et al. |
| 2011/0140970 A1 | 6/2011 | Fukagawa et al. |
| 2011/0169959 A1 | 7/2011 | DeAngelis et al. |
| 2011/0188513 A1 | 8/2011 | Christoffersson et al. |
| 2011/0195701 A1 | 8/2011 | Cook et al. |
| 2011/0261195 A1 | 10/2011 | Martin et al. |
| 2011/0300905 A1 | 12/2011 | Levi |
| 2011/0320322 A1 | 12/2011 | Roslak et al. |
| 2012/0014278 A1 | 1/2012 | Ameti et al. |
| 2012/0015665 A1 | 1/2012 | Farley et al. |
| 2012/0024516 A1 | 2/2012 | Bhadurt et al. |
| 2012/0042326 A1 | 2/2012 | Jain et al. |
| 2012/0057634 A1 | 3/2012 | Shi et al. |
| 2012/0057640 A1 | 3/2012 | Shi et al. |
| 2012/0065483 A1 | 3/2012 | Chung |
| 2012/0081531 A1 | 4/2012 | DeAngelis et al. |
| 2012/0112904 A1 | 5/2012 | Nagy |
| 2012/0126973 A1 | 5/2012 | DeAngelis et al. |
| 2012/0136231 A1 | 5/2012 | Market |
| 2012/0139708 A1 | 6/2012 | Paradiso et al. |
| 2012/0184878 A1 | 7/2012 | Najafi et al. |
| 2012/0212505 A1 | 8/2012 | Burroughs et al. |
| 2012/0218301 A1 | 8/2012 | Miller |
| 2012/0225676 A1 | 9/2012 | Boyd et al. |
| 2012/0231739 A1 | 9/2012 | Chen et al. |
| 2012/0246795 A1 | 10/2012 | Scheffler et al. |
| 2012/0256745 A1 | 10/2012 | Piett et al. |
| 2012/0268239 A1 | 10/2012 | Ljung et al. |
| 2013/0003860 A1 | 1/2013 | Sasai et al. |
| 2013/0021142 A1 | 1/2013 | Matsui et al. |
| 2013/0021206 A1 | 1/2013 | Hach et al. |
| 2013/0040574 A1 | 2/2013 | Hillyard |
| 2013/0041590 A1 | 2/2013 | Burich et al. |
| 2013/0041775 A1 | 2/2013 | Rosenberg |
| 2013/0057392 A1 | 3/2013 | Bullock |
| 2013/0066448 A1 | 3/2013 | Alonso |
| 2013/0076645 A1 | 3/2013 | Anantha et al. |
| 2013/0093625 A1 | 4/2013 | Smith |
| 2013/0096704 A1 | 4/2013 | Case, Jr. |
| 2013/0115904 A1 | 5/2013 | Kapoor et al. |
| 2013/0138386 A1 | 5/2013 | Jain et al. |
| 2013/0138518 A1 | 5/2013 | White et al. |
| 2013/0142384 A1 | 6/2013 | Ofek |
| 2013/0147608 A1 | 6/2013 | Sadr |
| 2013/0202062 A1 | 8/2013 | Sadr et al. |
| 2013/0257598 A1 | 10/2013 | Kawaguchi et al. |
| 2013/0268185 A1 | 10/2013 | Rabbath et al. |
| 2013/0289382 A1 | 10/2013 | Rofougaran et al. |
| 2013/0339156 A1 | 12/2013 | Sanjay et al. |
| 2014/0055588 A1 | 2/2014 | Bangera et al. |
| 2014/0145828 A1 | 5/2014 | Bassan-Eskenazi et al. |
| 2014/0156036 A1 | 6/2014 | Huang |
| 2014/0170607 A1 | 6/2014 | Hsiao et al. |
| 2014/0221137 A1 | 8/2014 | Krysiak et al. |
| 2014/0301427 A1 | 10/2014 | Khalaf-Allah |
| 2014/0320660 A1 | 10/2014 | DeAngelis et al. |
| 2014/0361875 A1 | 12/2014 | O'Hagan et al. |
| 2014/0361906 A1 | 12/2014 | Hughes et al. |
| 2014/0361909 A1 | 12/2014 | Stelfox et al. |
| 2014/0364141 A1 | 12/2014 | O'Hagan et al. |
| 2014/0365415 A1 | 12/2014 | Stelfox et al. |
| 2015/0002272 A1 | 1/2015 | Alonso et al. |
| 2015/0057981 A1 | 2/2015 | Gross |
| 2015/0085111 A1 | 3/2015 | Lavery |
| 2015/0088617 A1 | 3/2015 | Geist et al. |
| 2015/0097653 A1 | 4/2015 | Gibbs et al. |
| 2015/0148129 A1 | 5/2015 | Austerlade et al. |
| 2015/0355311 A1 | 12/2015 | O'Hagan et al. |
| 2015/0358852 A1 | 12/2015 | Richley et al. |
| 2015/0360133 A1 | 12/2015 | MacCallum et al. |
| 2015/0375041 A1 | 12/2015 | Richley et al. |
| 2015/0375083 A1 | 12/2015 | Stelfox et al. |
| 2015/0378002 A1 | 12/2015 | Hughes et al. |
| 2015/0379387 A1 | 12/2015 | Richley |
| 2016/0059075 A1 | 3/2016 | Molyneux et al. |
| 2016/0097837 A1 | 4/2016 | Richley et al. |

FOREIGN PATENT DOCUMENTS

| | | |
|---|---|---|
| EP | 1253438 A2 | 10/2002 |
| EP | 1503513 A1 | 2/2005 |
| EP | 2474939 A1 | 7/2012 |
| WO | 98/05977 A1 | 2/1998 |
| WO | 99/61936 A1 | 12/1999 |
| WO | 01/08417 A1 | 2/2001 |
| WO | 2006/022548 A1 | 3/2006 |
| WO | 2010/083943 A1 | 7/2010 |
| WO | 2012167301 | 12/2012 |
| WO | 2015/051813 A1 | 4/2014 |
| WO | 2014/197600 A1 | 12/2014 |

OTHER PUBLICATIONS

Guéziec, "Tracking a Baseball Pitch for Broadcast Television," Computer, Mar. 2002, pp. 38-43 [http://www.trianglesoftware.com/pitch_tracking.htm].

"RFID in the Australian Meat and Livestock Industry", Allflex Australia Pty Ltd, Capalaba, QLD (AU), Data Capture Suppliers Guide, 2003-2004.

"A Guide to Using NLIS Approved Ear Tags and Rumen Boluses", National Livestock Identification Scheme, Meat & Livestock Australia Limited, North Sydney, Australia, May 2003.

Fontana et al., "Commercialization of an Ultra Wideband Precision Asset Location System", 2003 IEEE Conference on Ultra Wideband Systems and Technologies, Nov. 16-19, 2003.

Zhu et al., "A Real Time Articulated Human Motion Tracking Using Tri-Axis Inertial/Magnetic Sensors Package," IEEE Transactions on Neural Systems and Rehabilitation Engineering, vol. 12, No. 2, Jun. 2004, pp. 295-302.

CattleLog Pro, eMerge Interactive, Inc., Sebastian, FL, 2004.

King, "NAIS Cattle ID Pilot Projects Not Needed, Since Proven Advanced Technology Already Exists", ScoringSystem, Inc., Sarasota, FL, Dec. 27, 2005. [www.prweb.com/releases/2005/12prweb325888.htm].

Cheong, P. et al., "Synchronization, TOA and Position Estimation for Low-Complexity LDR UWB Devices", Ultra-Wideband, 2005 IEEE International Conference, Zurich, Switzerland Sep. 5-8, 2005, Piscataway, NJ, USA, IEEE, Sep. 5, 2005, pp. 480-484.

Zhang et al., "UWB Systems for Wireless Sensor Networks", Proceedings of the IEEE, IEEE. New York, US, vol. 97, No. 2, (Feb. 1, 2009), pp. 313-331.

Guvenc et al., "A Survey on TOA Based Wireless Localization and NLOA Mitigation Techniques", IEEE Communications Surveys, IEEE, New York, NY, US, vol. 11, No. 3, Oct. 1, 2009, pp. 107-124.

Swedberg, "N.J. Company Seeks to Market Passive Sensor RFID Tags," RFID Journal, Jun. 14, 2011, pp. 1-2 [http://www.rfidjournal.com/articles/pdf?8527].

Teixeira et al., "Tasking Networked CCTV Cameras and Mobile Phones to Identify and Localize Multiple People," Ubicomp '10 Proceedings of the 12th ACM International Conference on Ubiquitous Computing, pp. 213-222 (Sep. 26-29, 2010).

Bahle et al., "I See You: How to Improve Wearable Activity Recognition by Leveraging Information from Environmental Cameras," Pervasive Computing and Communications Workshops, IEEE International Conference, (Mar. 18-22, 2013).

(56) References Cited

OTHER PUBLICATIONS

Swedberg, "USDA Researchers Develop System to Track Livestock Feeding Behavior Unobtrusively", RFID Journal, Jul. 18, 2013.
U.S. Appl. No. 61/895,548, filed Oct. 25, 2013, In re: Alonso et al., entitled "Method, Apparatus, and Computer Program Product for Collecting Sporting Event Data Based on Real Time Data for Proximity and Movement of Objects."
Wang, Y. et al., "An Algorithmic and Systematic Approach from Improving Robustness of TOA-Based Localization", 2013 IEEE 10th International Conference on High Performance Computing and Communications & 2013 IEEE, Nov. 13, 2013, pp. 2066-2073.
U.S. Appl. No. 14/296,703, filed Jun. 5, 2014; In re: Alonso et al., entitled "Method and Apparatus for Associating Radio Frequency Identification Tags with Participants".
International Search Report and Written Opinion for International Application No. PCT/US2014/041062 dated Oct. 1, 2014.
International Search Report and Written Opinion for International Application No. PCT/US2014/040947 dated Oct. 3, 2014.
International Search Report and Written Opinion for International Application No. PCT/US2014/040881 dated Nov. 4, 2014.
International Search Report and Written Opinion for International Application No. PCT/US2014/049040 dated Dec. 17, 2014.
International Search Report and Written Opinion for International Application No. PCT/US2014/053647 dated Dec. 19, 2014.
Complaint before the United States District Court of Massachusetts, Civil Action No. 1:15-cv-12297, *Lynx System Developers, Inc. et al. v. Zebra Enterprise Solutions Corporation et al.*, filed Jun. 10, 2015.
International Search Report and Written Opinion for International Application No. PCT/IB2015/054213 dated Aug. 6, 2015.
International Search Report and Written Opinion for International Application No. PCT/IB2015/054103 dated Aug. 14, 2015.
International Search Report and Written Opinion for International Application No. PCT/US2015/034267 dated Sep. 25, 2015.
Invitation to Pay Additional Fees/Partial International Search Report for PCT/IB2015/054099 dated Oct. 6, 2015.
International Search Report and Written Opinion for International Application PCT/IB2015/054102 dated Nov. 4, 2015.
International Search Report and Written Opinion for International Application No. PCT/IB2015/054099 dated Dec. 9, 2015.
"Seattleite wins top prize in Microsoft's Super Bowl tech Contest", San Francisco AP, Komonews.com, Feb. 6, 2016. [http://komonews.com/news/local/seattleite-wins-top-prize-in-microsofts-super-bowl-tech-contest].
International Search Report and Written Opinion for International Application No. PCT/IB2015/059264 dated Feb. 10, 2016.
Complaint before the United States District Court of Massachusetts, Civil Action No. 1:15-cv-12297, *Lynx System Developers, Inc. et al. V. Zebra Enterprise Solutions Corporation et al.*, filed Mar. 23, 2016.
Defendant's Answer to Complaint before the United States District Court of Massachusetts, Civil Action No. 1:15-cv-12297, *Lynx System Developers, Inc. et al. V. Zebra Enterprise Solutions Corporation et al.*, filed Apr. 6, 2016.
International Search Report for International Application No. PCT/US2016/035614 dated Sep. 15, 2016.
Extended European Search Report for European Patent Application No. 14806811.7 dated Dec. 9, 2016.

US 10,212,262 B2

MODULAR LOCATION TAG FOR A REAL TIME LOCATION SYSTEM NETWORK

CROSS-REFERENCE TO RELATED APPLICATIONS

This patent arises from a continuation of U.S. patent application Ser. No. 14/732,360, filed Jun. 5, 2015, now U.S. Pat. No. 9,699,278, which is a continuation-in-part of U.S. patent application Ser. No. 14/205,216, filed Mar. 11, 2014, now U.S. Pat. No. 9,531,415, which claims priority to and the benefit of the filing date of U.S. Provisional Patent Application No. 61/831,990, filed Jun. 6, 2013. The contents of U.S. patent application Ser. No. 14/732,360, U.S. patent application Ser. No. 14/205,216, and U.S. Provisional Patent Application No. 61/831,990 are incorporated herein by reference in their entireties.

FIELD

Embodiments discussed herein are related to radio frequency locating and, more particularly, a modular location tag for a real time location system (RTLS) network.

BACKGROUND

A number of deficiencies and problems associated with location tags used in RTLS networks are identified herein. Through applied effort, ingenuity, and innovation, exemplary solutions to many of these identified problems are embodied by the present invention, which is described in detail below.

BRIEF SUMMARY

A modular location tag, method of manufacture, and method of use thereof may be disclosed. In an embodiment, a modular location tag may be provided including a controller including a microcontroller configured to generate a data packet and two or more individual transmit modules in data communication with the controller such that each individual transmit module is configured to transmit the data packet, each individual transmit module including an antenna and a pulse generator configured to transmit the data packet on ultra-wideband (UWB) blink data pulses. The controller may cause substantially simultaneous transmission of the UWB blink data pulses from the respective transmit modules to encourage reliable receipt of the UWB blink data pulses at one or more of a plurality of receivers.

In an example embodiment, the modular location tag may also include cables providing data communication between pulse generator the respective individual transmit modules of the two or more individual transmit modules and the microcontroller of the controller; and the cables define a common length. The substantially simultaneous transmission of the UWB blink data pulses may be based at least in part on the common length of the cables. In some example embodiments of the modular location tag, the cables may be disposed within an impact absorbent material. In an example embodiment of the modular location tag the cables may each comprise a plurality of flexible cables. In an example embodiment of the modular location tag, component based signal delays of the respective individual transmit modules of the two or more individual transmit modules may be matched. The substantially simultaneous transmission of the UWB blink data pulses may be based at least in part on the matched component based signal delays. In some example embodiments of the modular location tag, the microcontroller may be further configured to trigger the transmission of the UWB blink data pulses based on component based signal delays associated with the respective individual transmit modules component. The substantially simultaneous transmission of the UWB blink data pulses may be based at least in part on the triggering of the transmission of the UWB blink data pulses.

In an example embodiment of the modular location tag, the controller or the two or more individual transmit modules may be encased in an impact resistant enclosure. In some example embodiments of the modular location tag, the controller and the two or more individual transmit modules are configured to be mounted to a participant defining a front and back. A first transmit module of the two or more individual transmit modules is configured to be mounted to the front the participant and a second transmit module of the two or more individual transmit modules is configured to be mounted to the back of the participant. In an example embodiment of the modular location tag, the controller and the two or more individual transmit modules are configured to be mounted to a participant defining a front and back, wherein a first transmit module of the two or more individual transmit modules is configured to be mounted to a right front portion of the participant. A second transmit module of the individual transmits modules is configured to be mounted to a front left portion of the participant, a third transmit module of the two or more individual transmit modules is configured to be mounted to a back right portion of a participant, and a fourth transmit module of the individual transmit modules is configured to be mounted to a back left portion of the participant.

In an example embodiment of the modular location tag, the controller and two or more transmit modules may be incorporated into a participant protective equipment. In some example embodiments of the modular location tag, the controller and the two or more transmit modules may be incorporated into a participant clothing. In an example of the modular location tag, the controller may be mounted to a participant belt.

In an example embodiment, the modular location tag may also include an environmental sensor in data communication with the microcontroller. The microcontroller may be further configured to receive environmental data from the environmental sensor. In an example embodiment of the modular location tag, the environmental sensor may be an accelerometer. In an example embodiment of this modular location tag, the controller drives the substantially simultaneous transmission of the UWB blink data pulses at a first blink data pulse rate based on the accelerometer outputting an accelerometer data value at a first value and at a second blink data pulse rate based on the accelerometer outputting an accelerometer data at a second value. In some example embodiments of modular location tag, the environmental sensor may be at least one of a heart rate monitor, a humidity sensor, a temperature monitor, a moisture sensor, a breathing sensor, a global position sensor, a proximity sensor, or a pedometer.

In another example embodiment, a method of manufacturing a modular location tag may be provided including providing a controller including a microcontroller configured to generate a data packet and providing two or more individual transmit modules in data communication with the controller such that each individual transmit module is configured to transmit the data packet, each individual transmit module including an antenna and a pulse generator configured to transmit the data packet on ultra-wideband (UWB) blink data pulses. The controller may cause substantially simultaneous transmission of the UWB blink data pulses from the respective transmit modules encourage reliable receipt of the UWB blink data pulses at one or more of a plurality of receivers.

In an example embodiment, the method of manufacturing a modular location tag may also include providing cables providing data communication between the respective individual transmit modules of the plurality of individual transmit modules and the microcontroller of the controller, the cables define a common length. The substantially simultaneous transmission of the UWB blink data pulses may be based at least in part on the common length of the cables. In an example embodiment of this method of manufacturing a modular location tag, the cables may be disposed within an impact absorbent material. In some example embodiments of this method of manufacturing a modular location tag, the cables each comprise a plurality of flexible cables.

In an example embodiment of the method of manufacturing a modular location tag, component based signal delays of the respective individual transmit modules of the two or more transmit modules may be matched. The substantially simultaneous transmission of the UWB blink data pulses may be based at least in part on the matched component based signal delays. In some example embodiments of the method of manufacturing a modular location tag, the microcontroller may be further configured to trigger transmission of the UWB blink data pulses based on component based signal delays associated with the respective individual transmit modules. The substantially simultaneous transmission of the UWB blink data pulses may be based at least in part on the triggering of the transmission of the UWB blink data pulses In an example embodiment of the method of manufacturing a modular location tag, the controller or the two or more individual transmit modules may be encased in an impact resistant enclosure. In some embodiments of the method of manufacturing a modular location tag, the controller and the two or more individual transmit modules are configured to be mounted to a participant defining a front and back. A first transmit module of the two or more individual transmit modules is configured to be mounted to the front the participant and a second transmit module of the two or more individual transmit modules is configured to be mounted to the back of the participant. In an example embodiment of the method of manufacturing a modular location tag, the controller and the two or more individual transmit modules are configured to be mounted to a participant defining a front and back. A first transmit module of the two or more individual transmit modules is configured to be mounted to a right front portion of the participant, a second transmit module of the individual transmits modules is configured to be mounted to a front left portion of the participant, a third transmit module of the two or more individual transmit modules is configured to be mounted to a back right portion of a participant, and a fourth transmit module of the individual transmit modules is configured to be mounted to a back left portion of the participant.

In an example embodiment of the method of manufacturing a modular location tag, the controller and the two or more individual transmit modules may be incorporated into a participant protective equipment. In some example embodiment of the method of manufacturing a modular location tag, the controller and the two or more individual transmit modules may be incorporated into a participant clothing. In an example embodiment of the method of manufacturing a modular location tag, the controller may be mounted to a participant belt.

In an example embodiment, the method of manufacturing a modular location tag may also include providing an environmental sensor in data communication with the microcontroller. The microcontroller may be further configured to receive environmental data from the environmental sensor. In an example embodiment of this method of manufacturing a modular location tag, the environmental sensor may be an accelerometer. In some example embodiments of this method of manufacturing a modular location tag, the controller drives the substantially simultaneous transmission of the UWB blink data pulses at a first rate based on the accelerometer outputting accelerometer data value at a first rate and at a second rate based on the accelerometer outputting an accelerometer data at a second value. In some embodiments of the method of manufacturing a modular location tag, the environmental sensor may be at least one of a heart rate monitor, a humidity sensor, a temperature monitor, a moisture sensor, a breathing sensor, a global position sensor, a proximity sensor, or a pedometer.

In a further embodiment, a method may be provided including generating, by a microcontroller of a controller, a data packet and causing the transmission of the data packet on ultra-wideband (UWB) blink data pulses from two or more individual transmit modules. Each of the individual transmit module may include an antenna and pulse generator configured to transmit the data packet and may be in data communication with the controller. The controller may cause substantially simultaneous transmission of the UWB blink data pulses from the respective transmit modules to encourage reliable receipt of the receipt of the UWB blink data pulses at one or more of a plurality of receivers.

In an example embodiment of the method, cables which define a common length provide data communication between the two or more individual transmit modules and the microcontroller. In some example embodiments of the method, the cables may be disposed within an impact absorbent material. In an example embodiment of the method, the cables each comprise a plurality of flexible cables.

In an example embodiment of the method component based signal delays of the plurality of individual transmit modules may be matched. The substantially simultaneous transmission of the UWB blink data pulses may be based at least in part on the matched component based signal delays. In some example embodiments of the method, the microcontroller may be configured to trigger the transmission of the UWB blink data pulses based on component based signal delays associated with the respective individual transmit modules.

In some example embodiments of the method, the controller or the two or more individual transmit modules may be encased in an impact resistant enclosure. In an example embodiment, the method may also include mounting the controller and the two or more individual transmit modules are configured to be mounted to a participant defining a front and back. A first transmit module of the two or more individual transmit modules is configured to be mounted to the front the participant and a second transmit module of the two or more individual transmit modules is configured to be mounted to the back of the participant. In some example embodiments, the method may also include, the controller and the two or more individual transmit modules are configured to be mounted to a participant defining a front and back. A first transmit module of the two or more individual transmit modules is configured to be mounted to a right front portion of the participant, a second transmit module of the individual transmits modules is configured to be mounted to a front left portion of the participant, a third transmit module of the two or more individual transmit modules is configured to be mounted to a back right portion of a participant, and a fourth transmit module of the individual transmit modules is configured to be mounted to a back left portion of the participant.

In an example embodiment of the method, the controller and the two or more individual transmit modules may be incorporated into a participant protective equipment. In some example embodiments of the method, the controller and the two or more individual transmit modules may be incorporated into a participant clothing. In an example embodiment of the method, the controller may be mounted to a participant belt.

In an example embodiment, the method may also include receiving environmental data from an environmental sensor. In an example embodiment of this method, the environmental sensor may be an accelerometer. In some example embodiments of this method, the controller drives the substantially simultaneous transmission of the UWB blink data pulses at a first blink data pulse rate based on the accelerometer outputting an accelerometer data value at a first value and at a second blink data pulse rate based on the accelerometer outputting an accelerometer data at a second value. In an example embodiment of the method, the environmental sensor may be at least one of a heart rate monitor, a humidity sensor, a temperature monitor, a moisture sensor, a breathing sensor, a global position sensor, a proximity sensor, and a pedometer.

In a further example embodiment, a wearable modular location tag system is provided including a wearable article including a controller support and at least two transmitter supports, a controller, supported within the controller support, comprising a microcontroller configured to generate a data packet, two or more individual transmit modules, supported within the two or more transmitter supports, in data communication with the controller such that each individual transmit module is configured to transmit the data packet, each individual transmit module comprising an antenna and a pulse generator configured to transmit the data packet on ultra-wideband (UWB) blink data pulses. The controller is disposed between the at least two individual transmit modules and causes substantially simultaneous transmission of the UWB blink data pulses from the respective transmit modules to encourage reliable receipt of the UWB blink data pulses at one or more of a plurality of receivers.

In an example embodiment, the wearable location tag system also includes cables providing data communication between the pulse generators of the respective individual transmit modules of the two or more individual transmit modules and the microcontroller of the controller, wherein the cables define a common length. The substantially simultaneous transmission of the UWB blink data pulses is based at least in part on the common length of the cables. In some example embodiments of the wearable modular location tag system, the cables are disposed within an impact absorbent material.

In an example embodiment of the wearable location tag system the cables each comprise a plurality of flexible cables. In some example embodiments of the wearable modular location tag system, component based signal delays of the respective individual transmit modules of the two or more individual transmit modules are matched. The substantially simultaneous transmission of the UWB blink data pulses is based at least in part on the matched component based signal delays.

In an example embodiment of the wearable location tag system, the microcontroller is further configured to trigger the transmission of the UWB blink data pulses based on component based signal delays associated with the respective individual transmit modules. The substantially simultaneous transmission of the UWB blink data pulses is based at least in part on the triggering of the transmission of the UWB blink data pulses. In some example embodiments of the wearable modular location tag system, the controller or two or more of individual transmit modules are encased in an impact resistant enclosure.

In an example embodiment of the wearable location tag system, the controller and the two or more individual transmit modules are configured to be mounted to a participant defining a front and back, wherein a first transmit module of the two or more individual transmit modules is configured to be mounted to the front the participant and a second transmit module of the two or more individual transmit modules is configured to be mounted to the back of the participant.

In some example embodiments of the wearable modular location tag system, the controller and the two or more individual transmit modules are configured to be mounted to a participant defining a front and back, wherein a first transmit module of the two or more individual transmit modules is configured to be mounted to a right front portion of the participant, a second transmit module of the individual transmits modules is configured to be mounted to a front left portion of the participant, a third transmit module of the two or more individual transmit modules is configured to be mounted to a back right portion of a participant, and a fourth transmit module of the individual transmit modules is configured to be mounted to a back left portion of the participant. In an example embodiment of the wearable location tag system, the controller and two or more transmit modules are incorporated into a participant protective equipment.

In some example embodiments of the wearable modular location tag system, the controller and the two or more transmit modules are incorporated into a participant clothing. In an example embodiment of the wearable location tag system the controller is mounted to a participant belt. In some example embodiments, the wearable modular location tag system also includes an environmental sensor in data communication with the microcontroller. The microcontroller is further configured to receive environmental data from the environmental sensor.

In an example embodiment of the wearable location tag system the environmental sensor is an accelerometer. In some example embodiments of the wearable modular location tag system, the controller drives the substantially simultaneous transmission of the UWB blink data pulses at a first rate based on the accelerometer outputting accelerometer data value at a first rate and at a second rate based on the accelerometer outputting an accelerometer data at a second value. In an example embodiment of the wearable location tag system the environmental sensor is at least one of a heart rate monitor, a humidity sensor, a temperature monitor, a moisture sensor, a breathing sensor, a global position sensor, a proximity sensor, or a pedometer.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
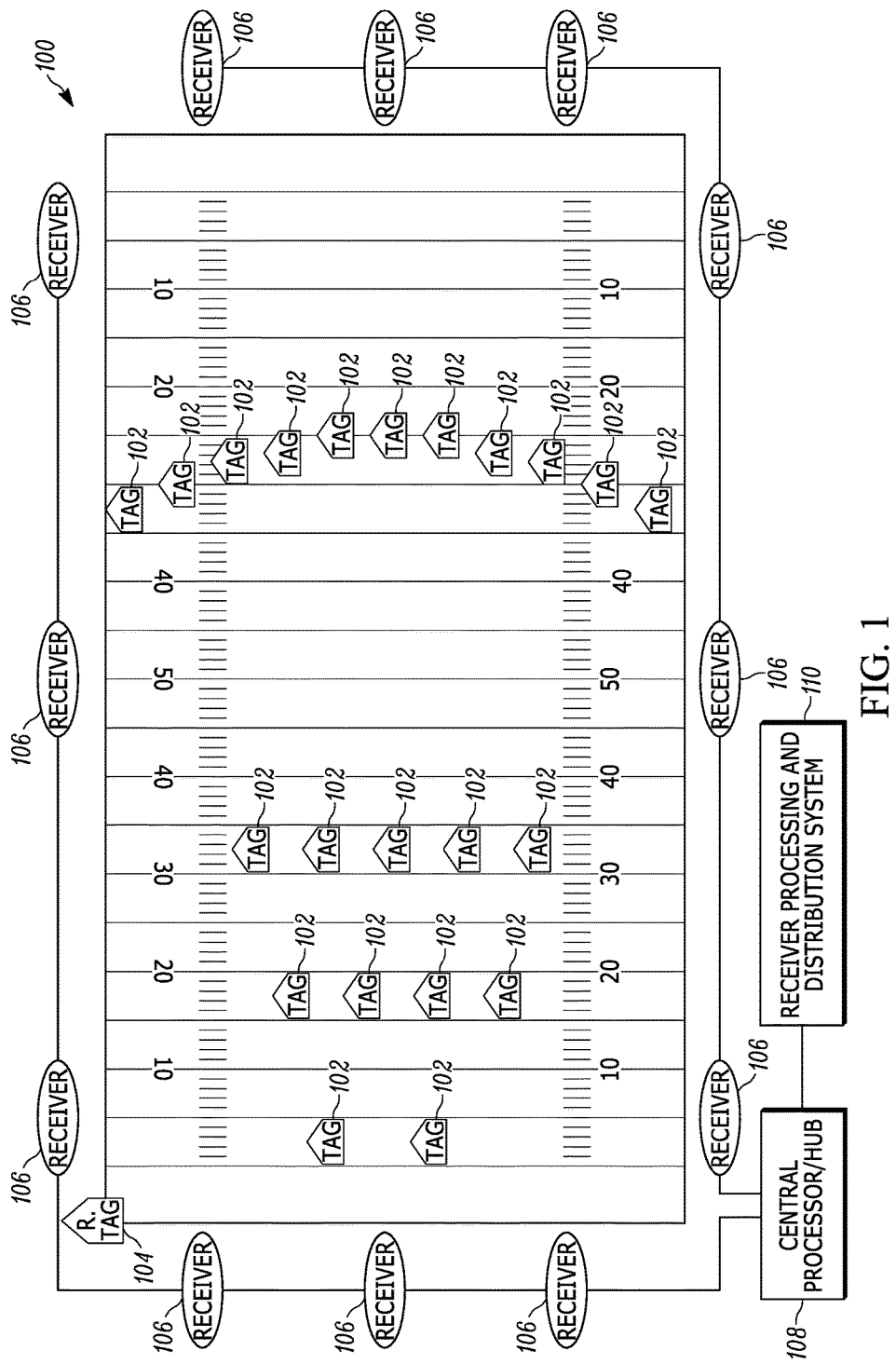
FIG. 1 illustrates an exemplary real time location system in accordance with some embodiments of the present invention.

The present invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

OVERVIEW

Radio frequency (RF) location systems generally use a single RF location tag or redundant RF location tag pair mounted at an elevated point on the tracked object or participant, such as the ears of livestock, shoulders of sports participants, top of boxes, or the like. However, the single RF location tag or redundant RF location tag pair in similar mounting locations, may be easily blocked, such as by a huddle (e.g., a huddle in American football), a water cooler, building column, the object or participant themselves, or the like.

Some radio frequency locating systems which utilize RFID transmissions from a RF location tag mounted to a tracked object or participant may suffer from missed data transmissions. The RF location systems may perform optimally only when there is a direct line of sight between the RF location tag and a plurality of receivers. In instances in which the object is shielded by building components, objects, animals, or people, the RFID tag transmission may not be received reliably by a sufficient number or distribution of receivers. In some cases only a delayed reflection is received, resulting in missed or inaccurate receipt of the RFID transmission. Since the time of fight measured by the time of arrival of the RFID transmission is used to determine the location of the tag in some examples, the RF location system will not be able to calculate an accurate location for a RF location tag for the period during which the RF location tag is shielded, e.g. blocked from some receivers.

In an example embodiment, a modular location tag may be provided which includes two or more transmitters, (e.g. transmit modules), controlled from a single controller. FIGS. 2-10 illustrate example modular location tags as types of RF location tags in accordance with example embodiments of the present invention. The transmit modules may be placed in opposing locations on the tracked object or participant, such as the back and chest of a sports participant. In an instance in which the participants chest transmit module is blocked the back transmit module may not be blocked. By transmitting from two or more opposed points on a tracked object or participant, the RF location system is likely to miss fewer location tag transmissions and therefore render more accurate location calculations. In other words, the RFID transmissions may be received by multiple receivers regardless of the orientation of the object or participant.

Additionally, in an instance in which the receiver central processor/hub is configured to use the first arrival of blink data from a RF location tag for location calculations, the calculated tag location may be more accurate, since there is a greater likelihood of a clear line of sight between at least one transmit module and a respective receiver. Therefore reflected RFID transmission may be excluded from the tag location calculation.

Example Real Time Locating System

FIG. 1 illustrates an exemplary locating system 100 useful for calculating a location by an accumulation of location data or time of arrivals (TOAs) at a central processor/hub 108, whereby the TOAs represent a relative time of flight (TOF) from RF location tags 102 as recorded at each receiver 106 (e.g., UWB reader, etc.). A timing reference clock is used, in some examples, such that at least a subset of the receivers 106 may be synchronized in frequency, whereby the relative TOA data associated with each of the RF location tags 102 may be registered by a counter associated with at least a subset of the receivers 106. In some examples, a reference tag 104, preferably a UWB transmitter, positioned at known coordinates, is used to determine a phase offset between the counters associated with at least a subset of the receivers 106. The RF location tags 102 and the reference tags 104 reside in an active RTLS field. The systems described herein may be referred to as either "multilateration" or "geolocation" systems, terms that refer to the process of locating a signal source by solving an error minimization function of a location estimate determined by the difference in time of arrival (DTOA) between TOA signals received at multiple receivers 106.

In some examples, the system comprising at least the RF location tags 102 and the receivers 106 is configured to provide two dimensional and/or three dimensional precision localization (e.g., subfoot resolutions), even in the presence of multipath interference, due in part to the use of short nanosecond duration pulses whose TOF can be accurately determined using detection circuitry, such as in the receivers 106, which can trigger on the leading edge of a received waveform. In some examples, this short pulse characteristic allows necessary data to be conveyed by the system at a higher peak power, but lower average power levels, than a wireless system configured for high data rate communications, yet still operate within local regulatory requirements.

In some examples, to provide a preferred performance level while complying with the overlap of regulatory restrictions (e.g. FCC and ETSI regulations), the tags 102 may operate with an instantaneous −3 dB bandwidth of approximately 400 MHz and an average transmission below 187 pulses in a 1 msec interval, provided that the packet rate is sufficiently low. In such examples, the predicted maximum range of the system, operating with a center frequency of 6.55 GHz, is roughly 200 meters in instances in which a 12 dBi directional antenna is used at the receiver, but the projected range will depend, in other examples, upon receiver antenna gain. Alternatively or additionally, the range of the system allows for one or more tags 102 to be detected with one or more receivers positioned throughout a football stadium used in a professional football context. Such a configuration advantageously satisfies constraints applied by regulatory bodies related to peak and average power densities (e.g., effective isotropic radiated power density ("EIRP")), while still optimizing system performance related to range and interference. In further examples, tag transmissions with a −3 dB bandwidth of approximately 400 MHz yields, in some examples, an instantaneous pulse width of roughly 2-2.5 nanoseconds that enables a location resolution to better than 30 centimeters.

Referring again to FIG. 1, the object to be located has an attached tag 102, preferably a tag having a UWB transmitter, that transmits a burst (e.g., multiple pulses at a 1 Mb/s burst rate, such as 112 bits of On-Off keying (OOK) at a rate of 1 Mb/s), and optionally, a burst comprising an information packet utilizing OOK that may include, but is not limited to, ID information, a sequential burst count or other desired information for object or personnel identification, inventory control, etc. In some examples, the sequential burst count (e.g., a packet sequence number) from each tag 102 may be advantageously provided in order to permit, at a Central Processor/Hub 108, correlation of TOA measurement data from various receivers 106.

In some examples, the tag 102 may employ UWB waveforms (e.g., low data rate waveforms) to achieve extremely fine resolution because of their extremely short pulse (i.e., sub-nanosecond to nanosecond, such as a 2 nsec (1 nsec up and 1 nsec down)) durations. As such, the information packet may be of a short length (e.g. 112 bits of OOK at a rate of 1 Mb/sec, in some example embodiments), that advantageously enables a higher packet rate. If each information packet is unique, a higher packet rate results in a higher data rate; if each information packet is transmitted repeatedly, the higher packet rate results in a higher packet repetition rate. In some examples, higher packet repetition rate (e.g., 12 Hz) and/or higher data rates (e.g., 1 Mb/sec, 2 Mb/sec or the like) for each tag may result in larger datasets for filtering to achieve a more accurate location estimate and resolve finer motion. Alternatively or additionally, in some examples, the shorter length of the information packets, in conjunction with other packet rate, data rates, and other system requirements, may also result in a longer battery life (e.g., 7 years battery life at a transmission rate of 1 Hz with a 300 mAh cell, in some present embodiments).

Tag signals may be received at a receiver directly from RF location tags, or may be received after being reflected en route. Reflected signals travel a longer path from the RF location tag to the receiver than would a direct signal, and are thus received later than the corresponding direct signal. This delay is known as an echo delay or multipath delay. If reflected signals are sufficiently strong enough to be detected by the receiver, they can corrupt a data transmission through inter-symbol interference. In some examples, the tag 102 may employ UWB waveforms to achieve extremely fine resolution because of their extremely short pulse (e.g., 2 nsec) durations. Furthermore, signals may comprise short information packets (e.g., 112 bits of OOK) at a somewhat high burst data rate (1 Mb/sec, in some example embodiments), that advantageously enable packet durations to be brief (e.g. 112 microsec) while allowing inter-pulse times (e.g., 998 nsec) sufficiently longer than expected echo delays, avoiding data corruption.

Reflected signals can be expected to become weaker as delay increases due to more reflections and the longer distances traveled. Thus, beyond some value of inter-pulse time (e.g., 998 nsec), corresponding to some path length difference (e.g., 299.4 m.), there will be no advantage to further increases in inter-pulse time (and, hence lowering of burst data rate) for any given level of transmit power. In this manner, minimization of packet duration allows the battery life of a tag to be maximized, since its digital circuitry need only be active for a brief time. It will be understood that different environments can have different expected echo delays, so that different burst data rates and, hence, packet durations, may be appropriate in different situations depending on the environment.

Minimization of the packet duration also allows a tag to transmit more packets in a given time period, although in practice, regulatory average EIRP limits may often provide an overriding constraint. However, brief packet duration also reduces the likelihood of packets from multiple tags overlapping in time, causing a data collision. Thus, minimal packet duration allows multiple tags to transmit a higher aggregate number of packets per second, allowing for the largest number of tags to be tracked, or a given number of tags to be tracked at the highest rate.

In one non-limiting example, a data packet length of 112 bits (e.g., OOK encoded), transmitted at a data rate of 1 Mb/sec (1 MHz), may be implemented with a transmit tag repetition rate of 1 transmission per second (1 TX/sec). Such an implementation may accommodate a battery life of up to seven years, wherein the battery itself may be, for example, a compact, 3-volt coin cell of the series no. BR2335 (Rayovac), with a battery charge rating of 300 mAhr. An alternate implementation may be a generic compact, 3-volt coin cell, series no. CR2032, with a battery charge rating of 220 mAhr, whereby the latter generic coin cell, as can be appreciated, may provide for a shorter battery life.

Alternatively or additionally, some applications may require higher transmit tag repetition rates to track a dynamic environment. In some examples, the transmit tag repetition rate may be 12 transmissions per second (12 TX/sec). In such applications, it can be further appreciated that the battery life may be shorter.

The high burst data transmission rate (e.g., 1 MHz), coupled with the short data packet length (e.g., 112 bits) and the relatively low repetition rates (e.g., 1 TX/sec), provide for two distinct advantages in some examples: (1) a greater number of tags may transmit independently from the field of tags with a lower collision probability, and/or (2) each independent tag transmit power may be increased, with proper consideration given to a battery life constraint, such that a total energy for a single data packet is less than a regulated average power for a given time interval (e.g., a 1 msec time interval for an FCC regulated transmission).

Alternatively or additionally, additional sensor or telemetry data may be transmitted from the tag to provide the receivers 106 with information about the environment and/or operating conditions of the tag. For example, the tag may transmit a temperature to the receivers 106. Such information may be valuable, for example, in a system involving perishable goods or other refrigerant requirements. In this example embodiment, the temperature may be transmitted by the tag at a lower repetition rate than that of the rest of the data packet. For example, the temperature may be transmitted from the tag to the receivers at a rate of one time per minute (e.g., 1 TX/min.), or in some examples, once every 720 times the data packet is transmitted, whereby the data packet in this example is transmitted at an example rate of 12 TX/sec.

Alternatively or additionally, the tag 102 may be programmed to intermittently transmit data to the receivers 106 in response to a signal from a magnetic command transmitter (not shown). The magnetic command transmitter may be a portable device, functioning to transmit a 125 kHz signal, in some example embodiments, with a range of approximately 15 feet or less, to one or more of the tags 102. In some examples, the tags 102 may be equipped with at least a receiver tuned to the magnetic command transmitter transmit frequency (e.g., 125 kHz) and functional antenna to facilitate reception and decoding of the signal transmitted by the magnetic command transmitter.

In some examples, one or more other tags, such as a reference tag 104, may be positioned within and/or about a monitored region. In some examples, the reference tag 104 may be configured to transmit a signal that is used to measure the relative phase (e.g., the count of free-running counters) of non-resettable counters within the receivers 106.

One or more (e.g., preferably four or more) receivers 106 are also positioned at predetermined coordinates within and/or around the monitored region. In some examples, the receivers 106 may be connected in a "daisy chain" fashion to advantageously allow for a large number of receivers 106 to be interconnected over a significant monitored region in order to reduce and simplify cabling, provide power, and/or the like. Each of the receivers 106 includes a receiver for receiving transmissions, such as UWB transmissions, and preferably, a packet decoding circuit that extracts a time of arrival (TOA) timing pulse train, transmitter ID, packet number, and/or other information that may have been encoded in the tag transmission signal (e.g., material description, personnel information, etc.) and is configured to sense signals transmitted by the tags 102 and one or more reference tags 104.

Each receiver 106 includes a time measuring circuit that measures times of arrival (TOA) of tag bursts, with respect to its internal counter. The time measuring circuit is phase-locked (e.g., phase differences do not change and therefore respective frequencies are identical) with a common digital reference clock signal distributed via cable connection from a central processor/hub 108 having a central timing reference clock generator. The reference clock signal establishes a common timing reference for the receivers 106. Thus, multiple time measuring circuits of the respective receivers 106 are synchronized in frequency, but not necessarily in phase. While there typically may be a phase offset between any given pair of receivers in the receivers 106, the phase offset is readily determined through use of a reference tag 104. Alternatively or additionally, each receiver may be synchronized wirelessly via virtual synchronization without a dedicated physical timing channel.

In some example embodiments, the receivers 106 are configured to determine various attributes of the received signal. Since measurements are determined at each receiver 106, in a digital format, rather than analog in some examples, signals are transmittable to the central processor/hub 108. Advantageously, because packet data and measurement results can be transferred at high speeds to a receiver memory, the receivers 106 can receive and process tag (and corresponding object) locating signals on a nearly continuous basis. As such, in some examples, the receiver memory allows for a high burst rate of tag events (i.e., information packets) to be captured.

Data cables or wireless transmissions may convey measurement data from the receivers 106 to the central processor/hub 108 (e.g., the data cables may enable a transfer speed of 2 Mbps). In some examples, measurement data is transferred to the central processor/hub at regular polling intervals.

As such, the central processor/hub 108 determines or otherwise computes tag location (i.e., object location) by processing TOA measurements relative to multiple data packets detected by the receivers 106. In some example embodiments, the central processor/hub 108 may be configured to resolve the coordinates of a tag using nonlinear optimization techniques.

In some examples, TOA measurements from multiple receivers 106 are processed by the central processor/hub 108 to determine a location of the transmit tag 102 by a differential time-of-arrival (DTOA) analysis of the multiple TOAs. The DTOA analysis includes a determination of tag transmit time $t_0$, whereby a time-of-flight (TOF), measured as the time elapsed from the estimated tag transmit time $t_0$ to the respective TOA, represents graphically the radii of spheres centered at respective receivers 106. The distance between the surfaces of the respective spheres to the estimated location coordinates $(x_0, y_0, z_0)$ of the transmit tag 102 represents the measurement error for each respective TOA, and the minimization of the sum of the squares of the TOA measurement errors from each receiver participating in the DTOA location estimate provides for both the location coordinates $(x_0, y_0, z_0)$ of the transmit tag and of that tag's transmit time $t_0$.

In some examples, the system described herein may be referred to as an "over-specified" or "over-determined" system. As such, the central processor/hub 108 may calculate one or more valid (i.e., most correct) locations based on a set of measurements and/or one or more incorrect (i.e., less correct) locations. For example, a location may be calculated that is impossible due the laws of physics or may be an outlier when compared to other calculated locations. As such one or more algorithms or heuristics may be applied to minimize such error.

The starting point for the minimization may be obtained by first doing an area search on a coarse grid of x, y and z over an area defined by the user and followed by a localized steepest descent search. The starting location for this algorithm is fixed, in some examples, at the mean position of all active receivers. No initial area search is needed, and optimization proceeds through the use of a Davidon-Fletcher-Powell (DFP) quasi-Newton algorithm in some examples. In other examples, a steepest descent algorithm may be used.

One such algorithm for error minimization, which may be referred to as a time error minimization algorithm, may be described in Equation 1:

$$\varepsilon = \sum_{j=1}^{N} \left[ [(x-x_j)^2 + (y-y_j)^2 + (z-z_j)^2]^{\frac{1}{2}} - c(t_j - t_0) \right]^2 \quad (1)$$

Where N is the number of receivers, c is the speed of light, $(x_j, y_j, z_j)$ are the coordinates of the $j^{th}$ receiver, $t_j$ is the arrival time at the $j^{th}$ receiver, and $t_0$ is the tag transmit time. The variable $t_0$ represents the time of transmission. Since $t_0$ is not initially known, the arrival times, $t_j$, as well as $t_0$, are related to a common time base, which in some examples, is derived from the arrival times. As a result, differences between the various arrival times have significance for determining location as well as $t_0$.

The optimization algorithm to minimize the error ε in Equation 1 may be the Davidon-Fletcher-Powell (DFP) quasi-Newton algorithm, for example. In some examples, the optimization algorithm to minimize the error ε in Equation 1 may be a steepest descent algorithm. In each case, the algorithms may be seeded with an initial location estimate (x, y, z) that represents the two-dimensional (2D) or three-dimensional (3D) mean of the positions of the receivers 106 that participate in the tag location determination. Additionally or alternatively, the algorithm may be seeded with a previously calculated location.

In some examples, the RTLS system comprises a receiver grid, whereby each of the receivers 106 in the receiver grid keeps a receiver clock that is synchronized, with an initially unknown phase offset, to the other receiver clocks. The phase offset between any receivers may be determined by use of a reference tag that is positioned at a known coordinate position $(x_T, y_T, z_T)$. The phase offset serves to resolve the constant offset between counters within the various receivers 106, as described below.

In further example embodiments, a number N of receivers 106 $\{R_j, j=1, \ldots, N\}$ are positioned at known coordinates $(x_{R_j}, y_{R_j}, z_{R_j})$, which are respectively positioned at distances $d_{R_j}$ from a reference tag 104, such as given in Equation 2:

$$d_{R_j} = \sqrt{(x_{R_j}-x_T)^2 + (y_{R_j}-y_T)^2 + (z_{R_j}-z_T)^2} \quad (2)$$

Each receiver $R_j$ utilizes, for example, a synchronous clock signal derived from a common frequency time base, such as a clock generator. Because the receivers are not synchronously reset, an unknown, but constant offset $O_j$ exists for each receiver's internal free running counter. The value of the constant offset $O_j$ is measured in terms of the number of fine resolution count increments (e.g., a number of nanoseconds for a one nanosecond resolution system).

The reference tag is used, in some examples, to calibrate the radio frequency locating system as follows: The reference tag emits a signal burst at an unknown time TR. Upon receiving the signal burst from the reference tag, a count $N_{R_j}$ as measured at receiver $R_j$ is given in Equation 3 by:

$$N_{R_j} = \beta \tau_R + O_j + \beta d_{R_j}/c \quad (3)$$

Where c is the speed of light and β is the number of fine resolution count increments per unit time (e.g., one per nanosecond). Similarly, each object tag $T_i$ of each object to be located transmits a signal at an unknown time $\tau_i$ to produce a count $N_{ij}$, as given in Equation 4:

$$N_{ij} = \beta \tau_i + O_j + \beta d_{ij}/c \quad (4)$$

at receiver $R_j$ where $d_{ij}$ is the distance between the object tag $T_i$ and the receiver 106 $R_j$. Note that $\tau_i$ is unknown, but has the same constant value for all receivers. Based on the equalities expressed above for receivers $R_j$ and $R_k$ and given the reference tag 104 information, phase offsets expressed as differential count values are determined as given in Equations 5a-b:

$$N_{R_j} - N_{R_k} = (O_j - O_k) + \beta \left( \frac{d_{R_j}}{c} - \frac{d_{R_k}}{c} \right) \quad (5a)$$

Or, $$(O_j - O_k) = (N_{R_j} - N_{R_k}) - \beta \left( \frac{d_{R_j}}{c} - \frac{d_{R_k}}{c} \right) = \Delta_{jk} \quad (5b)$$

Where $\Delta_{jk}$ is constant as long as $d_{R_j}$-$d_{R_k}$ remains constant, (which means the receivers and reference tag are fixed and there is no multipath situation) and β is the same for each receiver. Note that $\Delta_{jk}$ is a known quantity, since $N_{R_j}$, $N_{R_k}$, β, $d_{R_j}/c$, and $d_{R_k}/c$ are known. That is, the phase offsets between receivers $R_j$ and $R_k$ may be readily determined based on the reference tag 104 transmissions. Thus, again from the above equations, for a tag 102 ($T_i$) transmission arriving at receivers $R_j$ and $R_k$, one may deduce the following Equations 6a-b:

$$N_{ij} - N_{ik} = (O_j - O_k) + \beta \left( \frac{d_{ij}}{c} - \frac{d_{ik}}{c} \right) = \Delta_{jk} + \beta \left( \frac{d_{ij}}{c} - \frac{d_{ik}}{c} \right) \quad (6a)$$

Or, $$d_{ij} - d_{ik} = (c/\beta)[N_{ij} - N_{ik} - \Delta_{jk}] \quad (6b)$$

Each arrival time, $t_j$, can be referenced to a particular receiver (receiver "1") as given in Equation 7:

$$t_j = \frac{1}{\beta}(N_j - \Delta_{j1}) \quad (7)$$

The minimization, described in Equation 1, may then be performed over variables (x, y, z, $t_0$) to reach a solution (x', y', z', $t_0$').

Example Modular Location Tag

Figure 2:
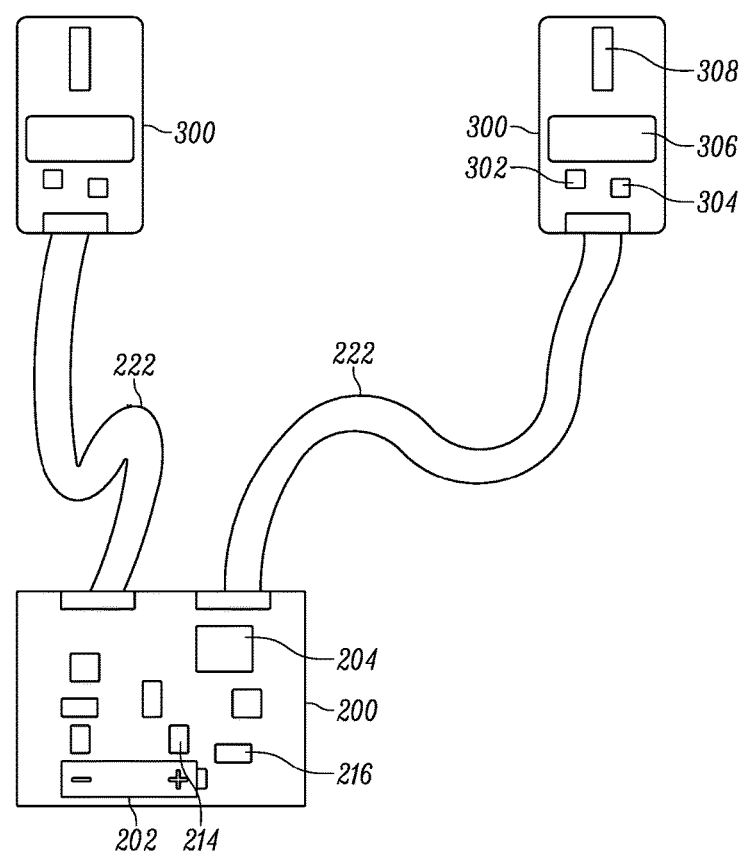
FIG. 2 illustrates an exemplary modular location tag diagram in accordance with some embodiments of the present invention.

FIG. 2 illustrates a modular location tag diagram in accordance with an example embodiment of the invention. In an example embodiment, the RF location tag 102 discussed in FIG. 1 may be a modular location tag. The modular location tag may include a controller 200, two or more transmit modules 300, and cables 222. The controller 200 may be electrically connected, e.g. in data communication, with the transmit modules 300 through the cables 222.

The controller 200 may include a battery 202, charge pump 214, voltage regulator 216, microcontroller 204, or the like. The microcontroller 204 may be configured to generate data packet information, control data rates, control data packet lengths, or the like. The controller 200 may also drive or control transmission from the transmit modules 300

The transmit modules 300 may include a baseband pulse generator 302, an RF oscillator 304, and an antenna 308. The baseband pulse generator 302 may drive the oscillator 304 and transmit blink data including the data packet using the antenna 308. The tag signal transmitted from the transmission modules 300 may be referred to herein as "blink data" or "a blink data pulse" as it is transmitted at selected intervals comprising a blink (e.g., 72 pulses at a blink rate of 1 Mb/s). Blink data may also comprise one or more tag data packets. Such tag data packets may include any data from the modular location tag that is intended for transmission such as, for example in the depicted embodiment, a tag unique identification number (tag UID), other identification information, a sequential burst count, stored tag data, or other desired information for object or personnel identification, inventory control, etc. In some examples, the sequential burst count (e.g., a packet sequence number) from each modular location tag may be advantageously provided in order to permit, at a receiver hub 108, correlation of time of arrival (TOA) measurement data from various receivers, of an RF location system. In the case of time difference of arrival (TDOA) systems, the blink data may be or include a specific pattern, code, or trigger that the RF location system detects to identify that the transmission is from a modular location tag.

The configuration of the controller 200, transmit modules 300, and/or cables 222 may cause the transmission of the blink data to be simultaneous or substantially simultaneous to encourage reliable receipt of blink data by a plurality of receivers. A detailed description of the functions and operations of the controller 200 and transmit modules 300 is provided below in FIG. 3A.

Exemplary Modular Location Tag Block Diagram

Figure 3A:
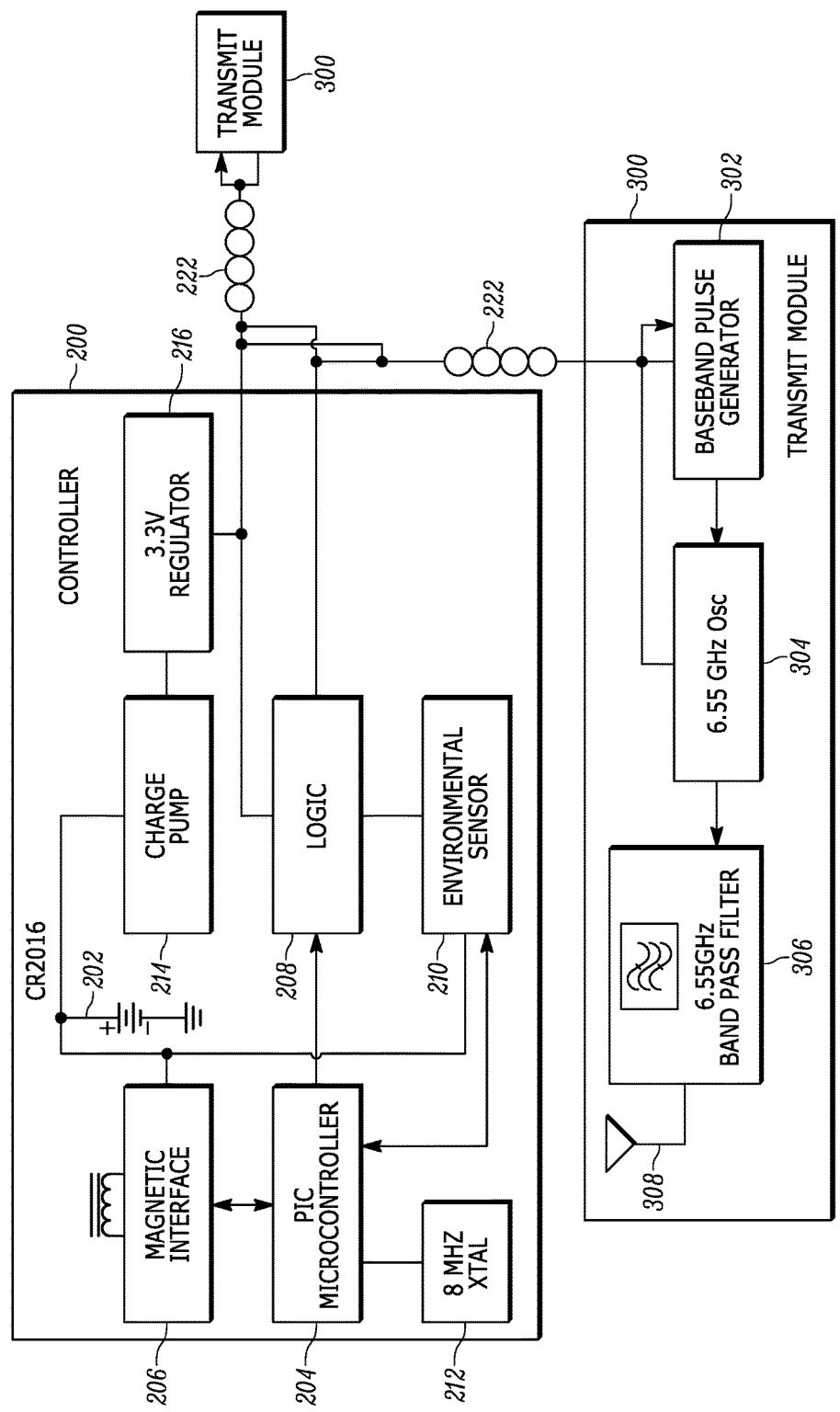
FIG. 3A illustrates an exemplary modular location tag block diagram in accordance with some embodiments of the present invention.

FIG. 3A illustrates a block diagram of an exemplary modular location tag in accordance with an example embodiment of the present invention. The modular location tag may include a controller 200 and two or more transmit modules 300. The controller 200 may be in electrical and data communication with the respective transmit modules through cables 222.

In some examples, the controller 200 may include a battery 202, a microcontroller 204, magnetic interface 206, logic 208, environmental sensor 210, an oscillator 212, a charge pump 214, and a voltage regulator 216. In some examples, the transmit modules 300 may include a baseband pulse generator 302, an oscillator 304, a band pass filter 306, and an antenna 308.

The controller battery 202 may be attached to a ground and supply direct current to the microcontroller 204, magnetic interface 206, logic 208, environmental sensor 210, and charge pump 214. The battery 202 may be a compact, 3-volt coin cell, such as series no. BR2335 (Rayovac) with a battery charge rating of 300 mAhr, or series no. CR2032, with a battery charge rating of 220 mAhr, or the like. The example 3-volt coin cell battery is provided as an example, one of ordinary skill in the art would recognize that other batteries may be used depending on the size, shape, or accessibility of the tag 102 or controller 200.

The charge pump 214 may increase the supplied battery voltage, e.g. 3 volts for regulation by the voltage regulator 216, for example the voltage may be regulated at 3.3 volts and output to the logic 208 and the transmit modules 300, through cables 222. The charge pump 214 may be a DC to DC (direct current) converter based on two stage capacitor switching. In some embodiments, the output of the charge pump 214 may be smoothed by an output capacitor. The voltage regulator 216 may be a resistor in series with one or more diodes to provide a stable voltage, e.g. 3.3 volts. The regulated power may be supplied to the baseband pulse generator 302 and the oscillator 304.

The microcontroller 204, such as a programmable interface controller (PIC) microcontroller, may be configured to generate data packets, as described above in FIG. 1. In an example embodiment the microcontroller is a PI C16LF1518T-I as made by Microchip Technology, Inc. The microcontroller 204 may include an internal memory, such as read only memory (ROM), electronic programmable memory (EPROM), flash ROM, or the like, configured to store program code for generation of the data packets and triggering data transmissions from the transmit modules 300, e.g., blink data. The microcontroller 204 may include a set of registers which may function as random access memory (RAM). The microcontroller 204 may store tag information, such as the tag UID, other identification information, a sequential burst count, stored tag data, or other desired information for object or personnel identification, inventory control, etc. in one or more registers. The microcontroller 204 may generate a data packet by reading one or more registers identified by the program code and transmits the data maintained in the registers to the logic 208 and/or the transmit modules 300.

Additionally, the microcontroller 204 may receive environmental data from the environmental sensor 210. In an example embodiment, the microcontroller 204 may store the sensor data in the registers. The environmental sensor 210 may be an accelerometer, a heart rate monitor, a humidity sensor, a temperature monitor, a moisture sensor, a breathing sensor, a global position sensor, a proximity sensor, a pedometer, or the like. In an instance in which the microcontroller 204 receives environmental data from the environmental sensor 210, the microcontroller may include the environmental data or a portion of the environmental data in the data packet.

The microcontroller 204 may receive clock input from the oscillator 212, such as an 8 MHz crystal oscillator. The clock may be used by the microcontroller 204 to advance the program code.

In an example embodiment, the microcontroller may control the blink data pulse rate based on input from the environmental sensor 210. The microcontroller 204 may use a first blink data pulse rate, e.g. low, at a first time with a first environmental data value, and a second blink data pulse rate, e.g. high, at a second time with a second environmental data value. In some instances, the microcontroller 204 may make the determination of blink data pulse rate based on comparing the environmental data to a predetermined threshold. For example, the microcontroller may use a low or "idle" blink date pulse rate such as 1 blink/sec in an instance in which an environmental sensor, such as an accelerometer, does not detect movement, e.g. environmental data value fails to satisfy a predetermined threshold, and a high blink data pulse rate, such as a rate between 12 blinks/sec and 50 blinks/sec, in an instance in which the accelerometer detects movement, e.g. environmental data value satisfies the predetermined threshold.

The magnetic interface 206 may provide control signals to the microcontroller 204. In an example embodiment, the control signals may write program code to an EPROM or flash ROM. The magnetic interface 206 may receive signals from a portable or fixed computing device via a low frequency transmitter. The signals may include commands, such as commence blink data pulse transmissions, terminate blink data pulse transmissions, blink data pulse transmission rate, packet data rate, test modes, packet configuration, or the like.

The microcontroller 204 may send the data packet to the logic 208. The logic 208 may be a transmission trigger configured to output the data packet when triggered by the microcontroller 204. In some instances the logic 208 may trigger the transmission of the data packet at the same time, for example when the transmit module cable lengths or component delays are matched for simultaneous transmission of the blink data from the transmit modules 300. The transmit module components, e.g. baseband pulse generator 302, oscillator 304, band pass filter 306, antenna 308, or the like, may be batch or individually tested to determine a component based delay to 1 nsec. The transmit modules may then be matched by using components with the same aggregate delays. Similarly, the cable 222 length may be matched with precision to ensure delays between transmit modules are less than 1 nsec.

In some instances, the logic 208 may be configured to trigger the transmission of the data packet at different times to compensate for the delays caused by the cable 222 length mismatch or transmit module components. For example, the microcontroller 204 may trigger the logic 208 to transmit the data packet for a first transmit module at a first time and trigger the logic to transmit the data packet for a second transmit module at a second time, causing the transmission of the blink data from the first and second transmit module to occur simultaneously or substantially simultaneously, (e.g. less than 1 nsec variance between modules).

In some example embodiments, the controller may include a delay logic to compensate for delays caused by cable length mismatch or transmit module components.

Figure 6:
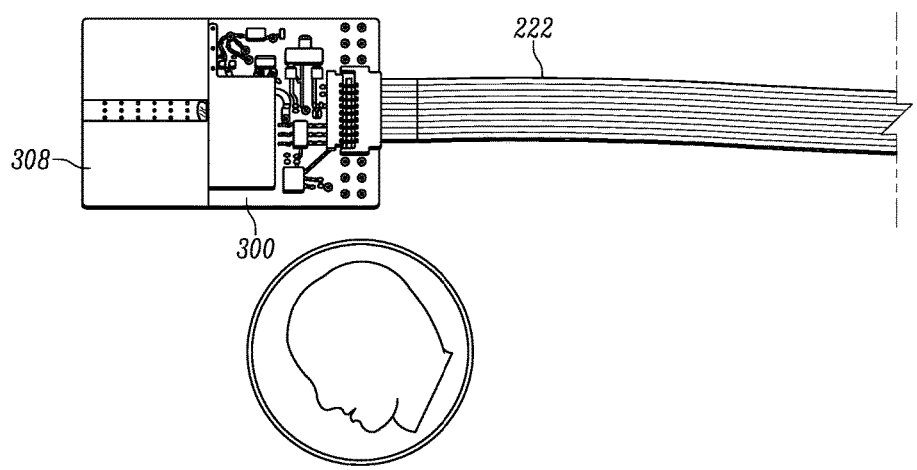
FIG. 6 illustrates a photograph of the exemplary transmit module and cable in accordance with some of the example embodiments of the present invention.

The data packet may be output to the transmit modules 300 as discussed, through the cables 222 and received by the base band generator 302 of the respective transmit module 300. The baseband generator 302 may drive the oscillator 304 to generate a transmission signal, e.g., blink data pulse transmissions, which may carry the data packet. The transmission signal may be filtered by a band pass filter 306 prior to transmission by an antenna 308, e.g., blink data pulse transmissions. In some embodiments, the antenna 308 is a vertically polarized antenna. An exemplary transmit module and cable is depicted in FIG. 6.

The blink data pulse transmissions may be transmitted simultaneously or substantially simultaneously, (e.g. less than 1 ns variance between transmission modules 300). The simultaneous or substantially simultaneous transmission of the blink data pulses form each of the transmit modules may allow for a greater number of receivers to receive the blink data, since there is a lower likelihood of blockage of the blink data signal from two or more transmission points as opposed to a single transmission point. Additionally, since more receivers will have a direct line of sight to the transmission point, e.g., one of the transmit modules, delay in the receipt of the blink data will be minimized or prevented because the receivers will receive the originally transmitted blink data and ignore or exclude from the location calculation reflected blink data transmissions.

Tag and Sensor Data Transmission Architecture

Figure 3B:
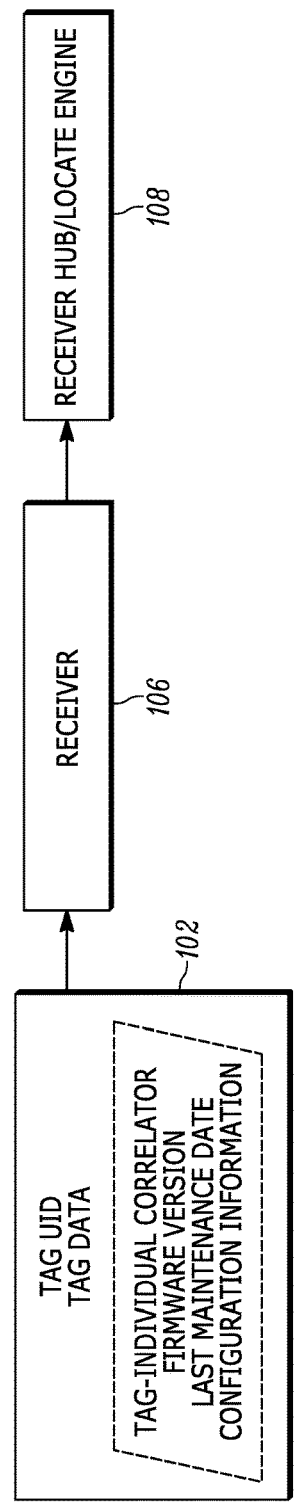
FIGS. 3B-3D illustrate block diagrams of example input and output of receivers and sensor receivers in accordance with some embodiments of the present invention.
Figure 3C:
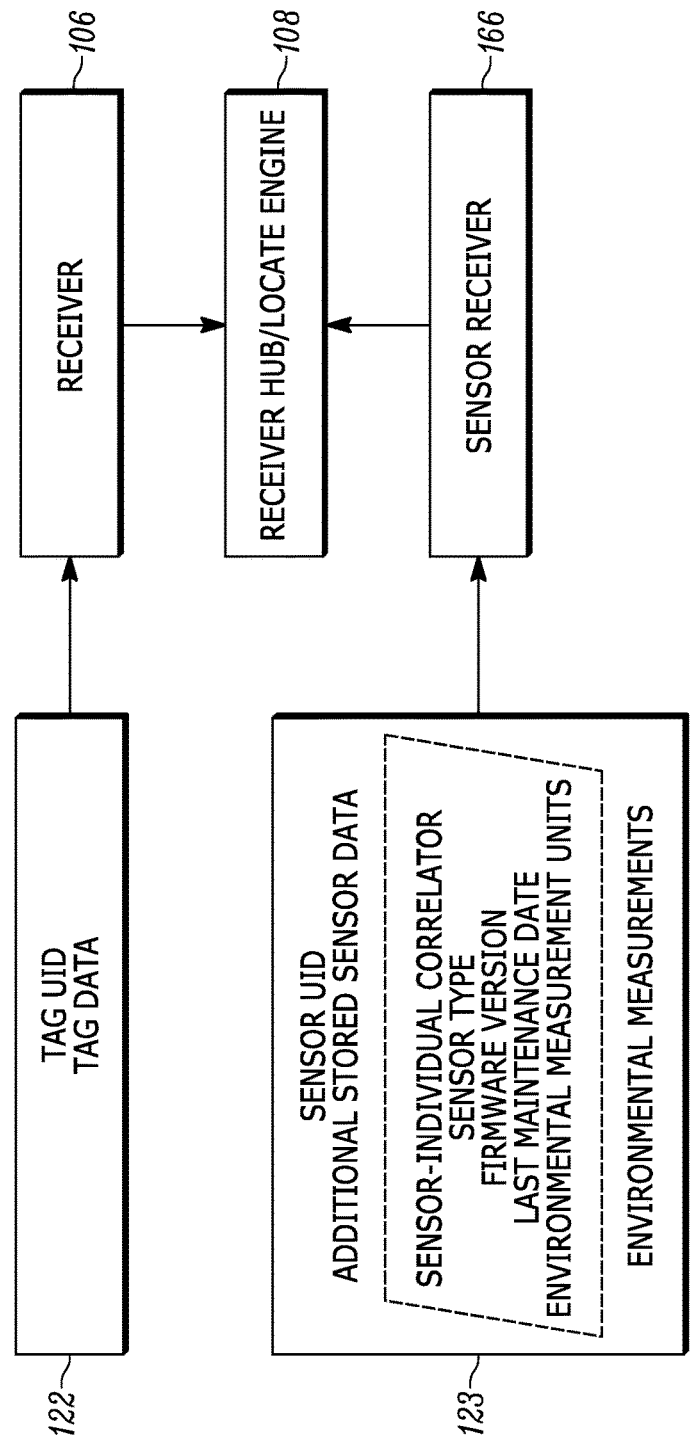
Figure 3D:
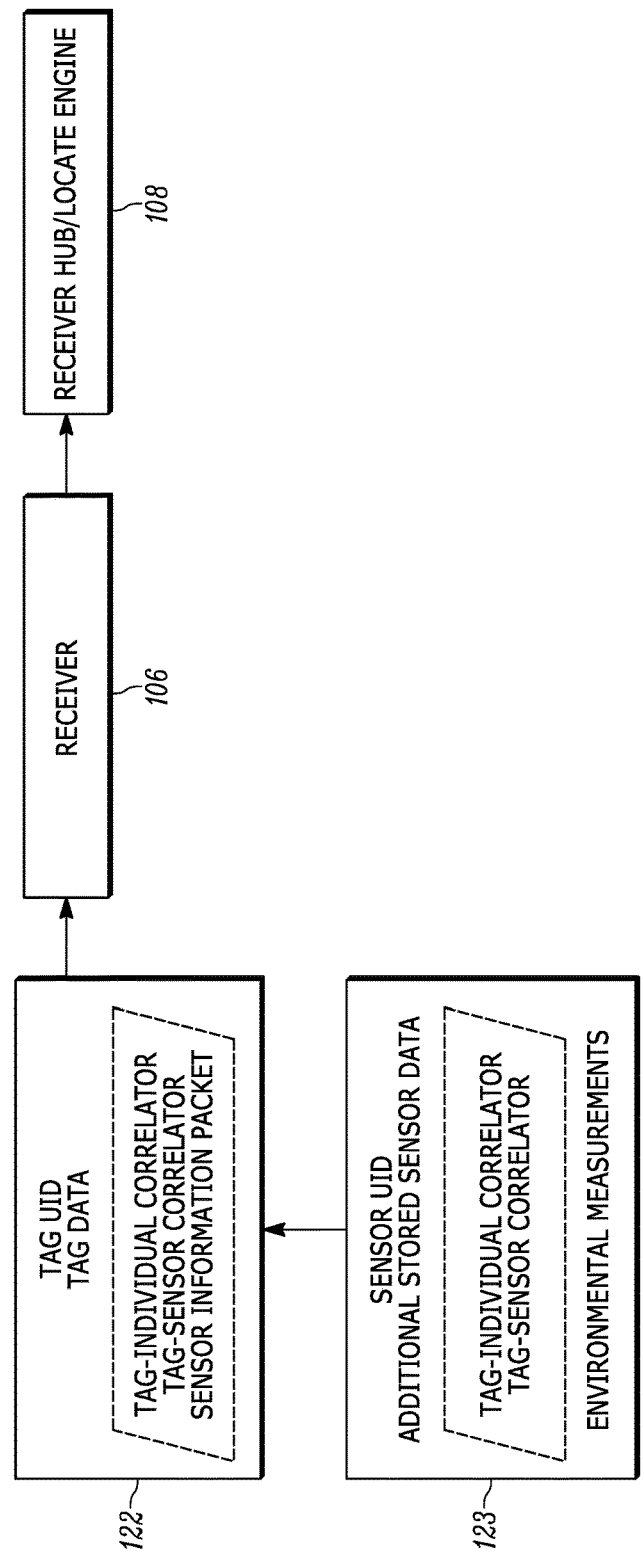

FIGS. 3B, 3C, and 3D show block diagrams of various different architectures that may be utilized in transmitting signals from one or more tags and sensors to one or more receivers of an RF location system in accordance with embodiments of the present invention. In some embodiments, the depicted architectures may be used in connection with the receiver processing and analytics system 110 of FIG. 1. More than one of these architectures may be used together in a single system.

FIG. 3B shows a location tag 102, such as that shown in FIG. 1, which may be configured to transmit a tag signal to one or more receivers 106. The one or more receivers 106 may transmit a receiver signal to the central processor/hub 108.

The depicted location tag 102 may generate or store a tag unique identifier (tag UID) and/or other tag data as shown. The tag data may include useful information such as the installed firmware version, last tag maintenance date, configuration information, and/or a tag-individual correlator. The tag-individual correlator may comprise data that indicates that a monitored individual (e.g., participant) is associated with the location tag 102 (e.g., name, uniform number and team, biometric data, tag position on individual, i.e., right wrist). As will be apparent to one of skill in the art in view of this disclosure, the tag-individual correlator may be stored to the location tag 102 when the tag is registered or otherwise associated with an individual. While shown as a separate field for illustration purposes, one of ordinary skill in the art may readily appreciate that the tag-individual correlator may be part of any tag data or even omitted from the tag.

The tag signal transmitted from location tag 102 to receiver 106 may include "blink data" as it is transmitted at selected intervals. This "blink rate" may be set by the tag designer or the system designer to meet application requirements. In some embodiments it is consistent for one or all tags; in some embodiments it may be data dependent. Blink data includes characteristics of the tag signal that allow the tag signal to be recognized by the receiver 106 so the location of the location tag 102 may be determined by the locating system. Blink data may also comprise one or more tag data packets. Such tag data packets may include any data from the tag 102 that is intended for transmission such as, for example in the depicted embodiment, a tag UID, tag data, and a tag-individual correlator. In the case of TDOA systems, the blink data may be or include a specific pattern, code, or trigger that the receiver 106 (or downstream receiver processing and analytics system) detects to identify that the transmission is from a location tag 102 (e.g., a UWB tag).

The depicted receiver 106 receives the tag signal, which includes blink data and tag data packets as discussed above. In one embodiment, the receiver 106 may pass the received tag signal directly to the central processor/hub 108 as part of its receiver signal. In another embodiment, the receiver 106 could perform some basic processing on the received tag signal. For instance, the receiver could extract blink data from the tag signal and transmit the blink data to the central processor/hub 108. The receiver could transmit a time measurement to the central processor/hub 108 such as a TOA measurement and/or a TDOA measurement. The time measurement could be based on a clock time generated or calculated in the receiver, it could be based on a receiver offset value, it could be based on a system time, and/or it could be based on the time difference of arrival between the tag signal of the location tag 102 and the tag signal of a RF reference tag (e.g., tag 104 of FIG. 1). The receiver 106 could additionally or alternatively determine a signal measurement from the tag signal (such as a received signal strength indication (RSSI)), a direction of signal, signal polarity, or signal phase) and transmit the signal measurement to the central processor/hub 108.

FIG. 3C shows a location tag 122 and sensor 123, such as may be affixed to an object or participant, which may be configured to transmit tag signals and sensor signals, respectively, to one or more receivers 106, 166. The one or more receivers 106, 166 may then transmit receiver signals to the central processor/hub 108. One or more receivers 106, 166 may share physical components, such as a housing or antenna.

The depicted location tag 122 may comprise a tag UID and tag data (such as a tag-individual correlator) and transmit a tag signal comprising blink data as discussed in connection with FIG. 3B above. The depicted sensor 123 may generate and/or store a sensor UID, additional stored sensor data (e.g. a sensor-individual correlator, sensor type, sensor firmware version, last maintenance date, the units in which environmental measurements are transmitted, etc.), and environmental measurements. The "additional stored sensor data" of the sensor 123 may include any data that is intended for transmission, including but not limited to a location tag 122, a reference tag (e.g., 104 of FIG. 1), a sensor receiver, a receiver 106, and/or the central processor/hub 108.

The sensor-individual correlator may comprise data that indicates that a monitored individual is associated with the sensor 123 (e.g., name, uniform number and team, biometric data, sensor position on individual, i.e., right wrist). As will be apparent to one of skill in the art in view of this disclosure, the sensor-individual correlator may be stored to the sensor 123 when the sensor is registered or otherwise associated with an individual. While shown as a separate field for illustration purposes, one of ordinary skill in the art may readily appreciate that the sensor-individual correlator may be part of any additional stored sensor data or omitted from the sensor altogether.

Sensors such as sensor 123 that are structured according to embodiments of the invention may sense or determine one or more environmental conditions (e.g. temperature, pressure, pulse, heartbeat, rotation, velocity, acceleration, radiation, position, chemical concentration, voltage) and store or transmit "environmental measurements" that are indicative of such conditions. To clarify, the term "environmental measurements" includes measurements concerning the environment proximate the sensor including, without limitation, ambient information (e.g., temperature, position, humidity, etc.) and information concerning an individual's health, fitness, operation, and/or performance. Environmental measurements may be stored or transmitted in either analog or digital form and may be transmitted as individual measurements, as a set of individual measurements, and/or as summary statistics. For example, temperature in degrees Celsius may be transmitted as {31}, or as {33, 32, 27, 22, 20, 23, 27, 30, 34, 31}, or as {27.9}. In some embodiments, the sensor-individual correlator could be determined at least in part from the environmental measurements.

In the embodiment depicted in FIG. 3C, location tag 122 transmits a tag signal to receiver 106 and sensor 123 transmits a sensor signal to sensor receiver 166. The sensor signal may comprise one or more sensor information packets. Such sensor information packets may include any data or information from the sensor 123 that is intended for transmission such as, for example in the depicted embodiment, sensor UID, additional stored sensor data, sensor-individual correlator, and environmental measurements. A receiver signal from receiver 106 and a sensor receiver signal from sensor receiver 166 may be transmitted via wired or wireless communication to central processor/hub 108 as shown.

FIG. 3D depicts a sensor 123 communicating through a location tag 122 in accordance with various embodiments. In one embodiment, the sensor 123 may be part of (i.e., reside in the same housing or assembly structure) of the location tag 122. In another embodiment, the sensor 123 may be distinct from (i.e., not resident in the same housing or assembly structure) the location tag 122 but configured to communicate wirelessly or via wired communication with the location tag 122.

In one embodiment, the location tag 122, the sensor 123, or both, may generate and/or store a tag-sensor correlator that indicates an association between a location tag 122 and a sensor 123 (e.g., tag UID/sensor UID, distance from tag to sensor in a particular stance, set of sensors associated with a set of tags, sensor types associated with a tag, etc.). In the depicted embodiment, both the location tag 122 and the sensor 123 store the tag-sensor correlator.

In the depicted embodiment, sensor 123 transmits a sensor signal to location tag 122. The sensor signal may comprise one or more sensor information packets as discussed above. The sensor information packets may comprise the sensor UID, a sensor-individual correlator, additional stored sensor data, the tag-sensor correlator, and/or the environmental measurements. The location tag 122 may store some portion of, or all of, the sensor information packets locally and may package the sensor information packets into one or more tag data packets for transmission to receiver 106 as part of a tag signal or simply pass them along as part of its tag signal.

Exemplary Modular Location Tag in Protective Components

Figure 4:
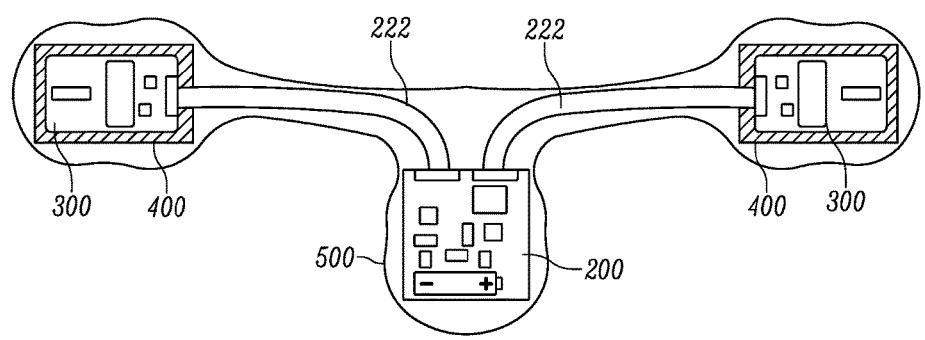
FIG. 4 illustrates a modular location tag modular diagram with protective components in accordance with some embodiments of the present invention.
Figure 7:
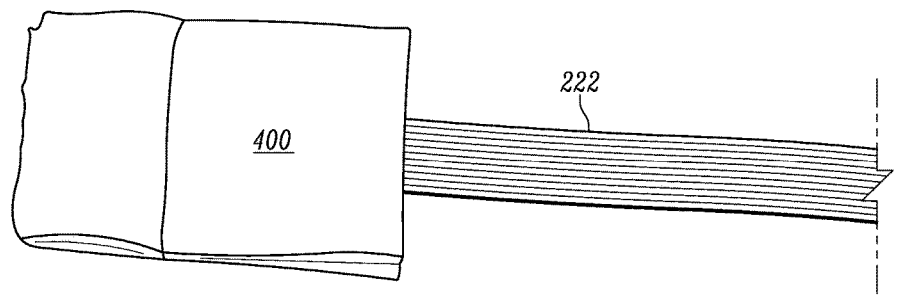
FIG. 7 illustrates a photograph of a representative depiction of a protective shell in accordance with some example embodiments of the present invention.

FIG. 4 illustrates an exemplary modular location tag in protective components. The modular location tag may include a controller 200, cables 222, two or more transmit modules 300, a protective shell 400, and a protective overmold 500. The respective transmit modules 300 may be encased in a protective shell 400. In some instances, the controller 200 may also be encased in a protective shell 400. The protective shell may be a hard plastic, elastomer, hard rubber, or other non-metallic impact resistant casing. A representative depiction of a protective shell is depicted in FIG. 7.

Figure 8:
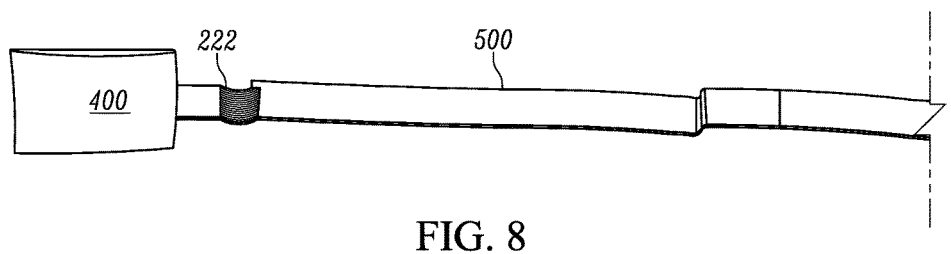
FIG. 8 illustrates a photograph of a representation of a transmit module in a protective shell and protective overmold around the cable in accordance with some example embodiments of the present invention.
Figure 9:
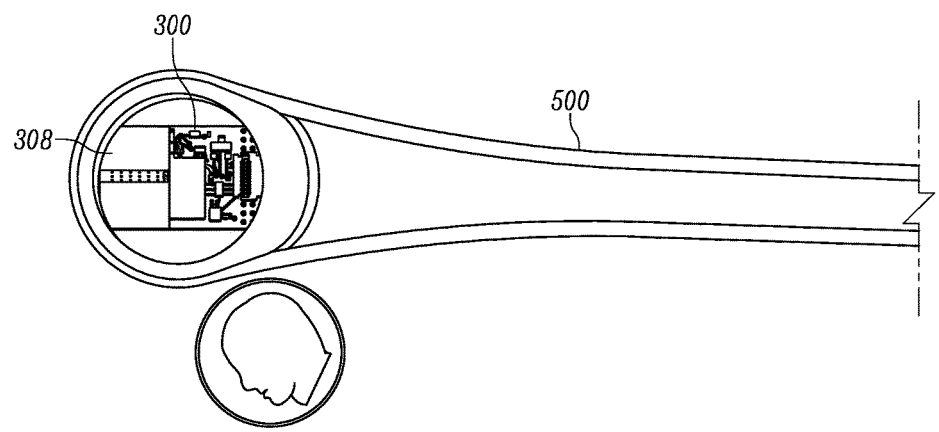
FIG. 9 illustrates a photograph of an elastomer protective overmold with insert slots for the transmit modules in accordance with some example embodiments of the present invention.
Figure 10:
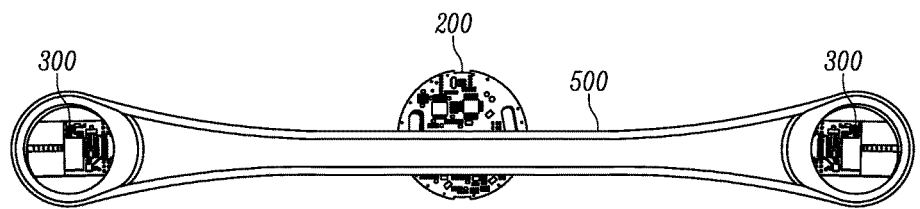
FIG. 10 illustrates a photograph of the approximate placement of the controller in accordance with some example embodiments of the present invention.

In some example embodiments, the controller 200, the respective transmit modules 300, and cables 222 may be covered in a protective overmold. The protective overmold may be elastomer, rubber, or other impact absorbent material. FIG. 8 depicts a representation of a transmit module in a protective shell 400 and protective overmold 500 around the cable 222. FIGS. 9 and 10 depict an elastomer protective overmold 500, with insert slots for the transmit modules 300, and approximate placement of the controller 200.

In an example embodiment, the cable 222 is a durable flexible cable, such as a shielded twisted pair cable. In some embodiments in which the cable is a durable flexible cable the protective overmold 500 may not be utilized, or may not cover the cable portions of the modular location tag, since the durable flexible cable may absorb impacts.

Exemplary Mounting of a Modular Location Tag

Figure 5:
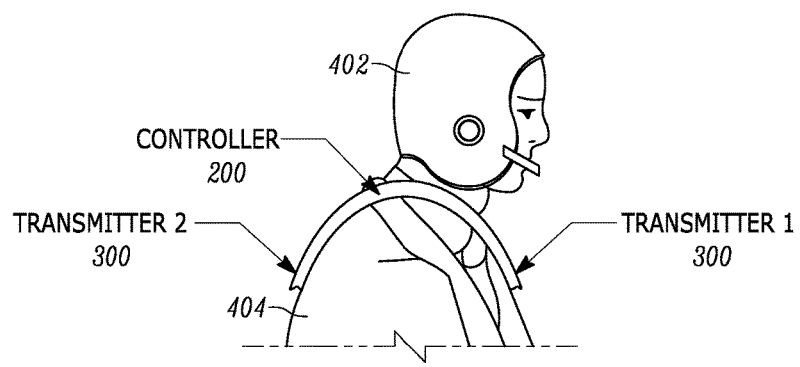
FIG. 5 illustrates a diagram of a modular location tag mounted on a participant in accordance with some example embodiments of the present invention.

FIG. 5 illustrates a diagram of a modular location tag mounted on a participant in accordance with some example embodiments of the present invention. A participant, such as an American football player, may be equipped with a modular location tag to track the location of the participant. In an example embodiment, the transmit modules 300 may be placed on the front and back of the participant, allowing for transmission from both transmit modules. Transmitting from both the front and back of the player may result in fewer missed tag blink data pulse transmissions, since the transmissions will originate from opposites sides of the participant. It is likely that if one transmit module 300 is blocked from a particular receiver, by persons, objects, building components, or the participants themselves, the opposing transmit module will not be blocked. Further, in instances in which the central processor/hub 108 is configured to use the first arrival of a blink data transmission, the tag location may be more accurate since reflected blink data will be ignored or excluded from the tag location calculation.

In some example embodiments, the modular location tag may include four transmit modules 300, which may be mounted to the participant on the front right and left and back right and left portions of the participant. This arrangement allows for greater reduction in missed tag blink transmissions. Further, in an example embodiment of this modular location tag configuration, the right and left transmit modules 300 may transmit different tag UIDs as directed by the controller 200. The right and left transmit module 300 differentiation may allow for the RF location system to determine whether the movement of the participant is forward or backward.

The transmit modules 300 may have a horizontal antenna orientation, therefore the transmit modules may be preferably mounted at a high point on the front or back of the participant, where the mounting location is substantially vertical. The controller 200 may be mounted to the shoulder or slightly behind the shoulder of the participant, or convenient mounting point, such as a belt. The shoulder or belt mounting location may provide support for the controller 200. The shoulder mounting location for the controller 200 may allow for shorter cable 222 lengths as the controller is between the transmit module 300 mounting locations.

In some example embodiments the controller 200 and/or the transit modules 300 may be incorporated into a wearable article, such as participant protective equipment 402, for example pads, helmets, or the like. Additionally or alternatively, the controller 200 and/or transmit modules 300 may be incorporated into participant clothing 404, such as jerseys, belts, hats, gloves, pants, or the like. In an example embodiment, the controller 200 may be mounted to a participant belt. The wearable article may have supports for the controller 200, the transmit module 300, power supply, environmental sensors, or the like. As depicted in FIG. 5, the controller 200 is preferably disposed between the individual transmit modules 300.

In some example embodiments, the controller 200 and/or the transmit modules 300 may be sewn or otherwise affixed to a participants clothing 404, e.g. jersey. In an example embodiment, the environmental sensors may be external to the controller 200 and also sewn in or otherwise affixed to the jersey.

Figure 11:
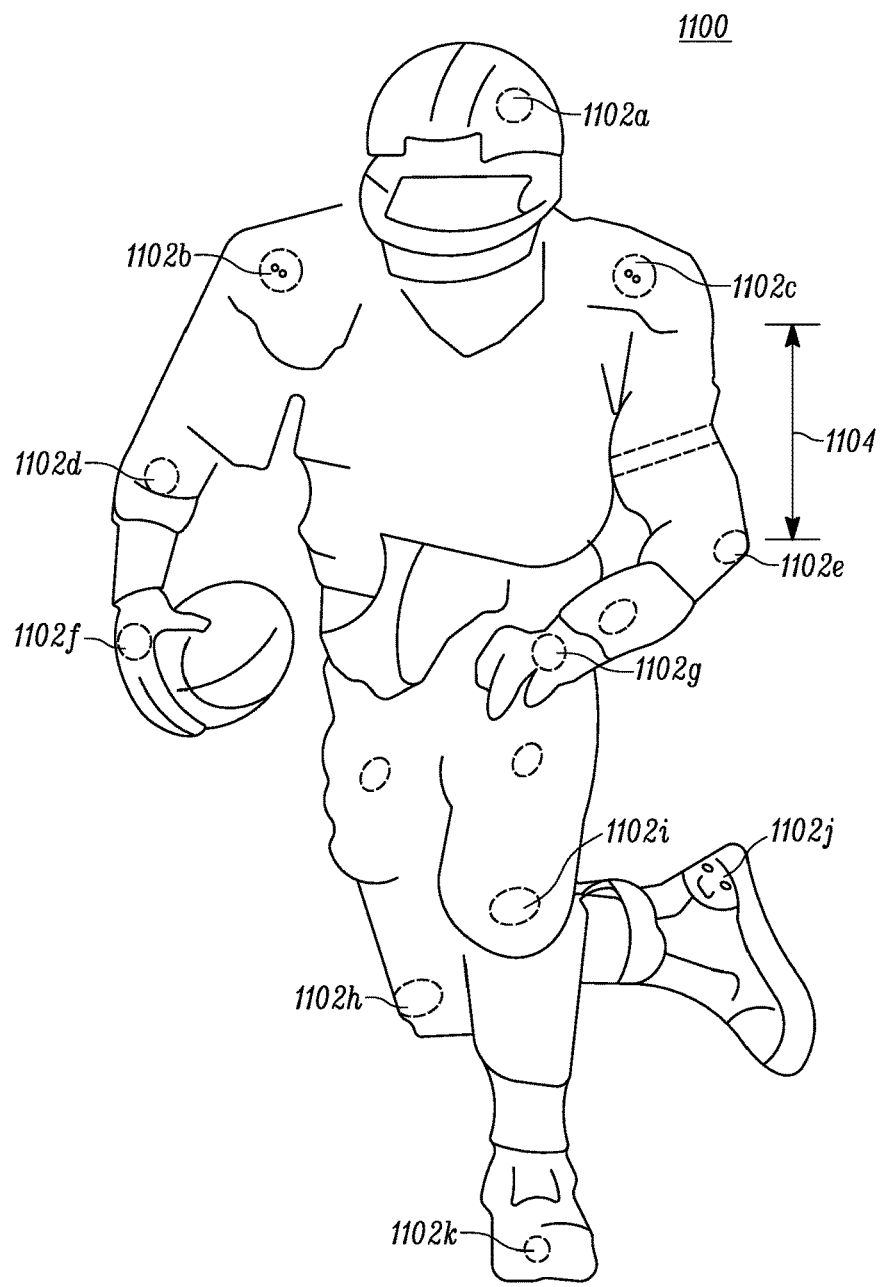
FIG. 11 illustrates an example arrangement of a plurality of tags on an individual, in accordance with some example embodiments of the present invention.

FIG. 11 shows a participant 1100, e.g., an American football player, equipped with an example arrangement of a plurality of modular location tags 1102a-k, which may represent one set of RF location tags 102 shown in FIG. 1. The plurality of modular location tags may be each located on participant 1100 at locations such that the plurality of modular location tags fully or at least partially define a human frame. For example, modular location tags may be placed at joints and/or extremities of participant 1100 that are of interest, with the transmit modules being placed on both the front and back of the participant at the joints and/or extremities. As such, modular location tags 1102a-k may provide robust location data for determining information concerning the body motion kinetics of participant 1100.

For example, modular location tag 1102a may be located at or near the head (e.g., within the helmet), modular location tags 1102b and 1102c may be located at or near the shoulders (e.g., under or proximate to each shoulder pad, respectively), modular location tags 1102d and 1102e may be located at or near the elbows (e.g., in each sleeve or elbow pad, respectively), modular location tags 1102f and 1102g may be located at or near the hands (e.g., in each glove or wrist brand, respectively), modular location tags 1102h and 1102i may be located at or near the knees (e.g., in each knee pad, respectively), and modular location tags 1102j and 1102k may be located at or near the feet (e.g., in each shoe, respectively). In some embodiments, one or more of modular location tags 1102a-k may be affixed to the body of participant 1100, such as by adhesive or perhaps as sewn into garments, or may be located on participant 1100 using any other suitable techniques.

Data derived or extracted from tag signals transmitted from one or more modular location tags may be referred to herein as "tag derived data" and shall include, without limitation, tag data, tag UID, tag-individual correlator (i.e., data that indicates a correlation to a specific individual), tag-sensor correlator (i.e., data that indicates a correlation to a specific RF location tag), tag data packets, blink data, time measurements (e.g. time of arrival, time difference of arrival, phase), signal measurements (e. g., signal strength, signal direction, signal polarization, signal phase), determined body distance data, and tag location data (e.g., including tag location estimates). Information or data derived or extracted from sensor signals transmitted from one or more sensors may be referred to herein as "sensor derived data" and shall include, without limitation, sensor UID, additional stored sensor data, sensor-individual correlator (i.e., data that indicates a correlation to a specific individual), environmental measurements, sensor information packets, position calculations (including sensor position estimates), position information, identity information, tag-sensor correlator (i.e., data that indicates a correlation to a specific RF location tag), and associated sensor data. In various embodiments, the central processor/hub 108 may transmit tag derived data, sensor derived data, and various combinations thereof to the receiver processing and distribution system 110.

In some embodiments, the central processor/hub and/or the receiver processing and distribution system may use the tag derived data and/or sensor derived data received from the modular location tags in determining events associated with participants and/or objects, as described in commonly owned U.S. patent application Ser. No. 13/942,316 to Wohl et al., which is herein incorporated by reference in its entirety. For example, the central processor/hub and/or the receiver processing and distribution system may use the tag derived data and/or sensor derived data to determine body motion kinetics and/or the activity of a participant, such as a participant running standing, crouching, squatting, bent over, in a three point stance, in a runner's start position, or other position that may be relevant to a specific sport or other endeavor, etc.

Exemplary Process for Manufacturing of a Modular Location Tag

Figure 12:
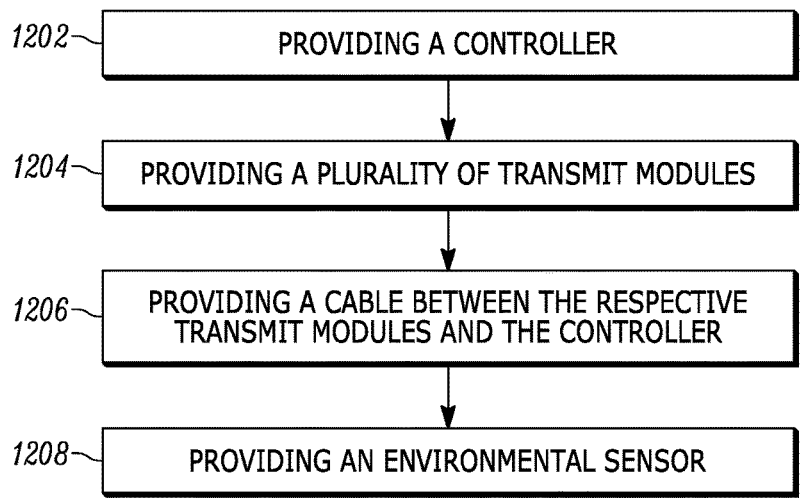
FIG. 12 illustrates a flowchart for a process of manufacturing a modular location tag in accordance with some of the example embodiments of the present invention.

FIG. 12 illustrates a flowchart for a process of manufacturing a modular location tag. At block 1202, a controller, such as controller 200, is provided including a microcontroller, such as microcontroller 204, configured to generate a data packet, as discussed in FIGS. 1 and 3A.

At block 1204, a plurality of individual transmit modules is provided. Each of the respective transmit modules, such as transmit modules 300, include an antenna and a pulse generator configured to transmit the data packet on ultra-wideband pulses. The UWB blink data pulses from the respective transmit modules are transmitted simultaneously or substantially simultaneously.

In an example embodiment, the controller 200 and/or the transmit modules 300 may be encased in an impact resistant enclosure, such as protective shell 400. In some example embodiments the controller 200 and/or the transit modules 300 may be incorporated into participant protective equipment 402, such as pads, helmets, or the like. Additionally or alternatively, the controller 200 and/or transmit modules 300 may be incorporated into participant clothing 404, such as jerseys, belts, hats, gloves, pants, or the like. In an example embodiment, the controller 200 may be mounted to a participant belt.

In an example embodiment, the controller 200 and transmit modules 300 may be configured to be mounted on a participant, for example, a first transmit module may be mounted to a front of the participant and a second transmit module may be mounted to a back of the participant. In another example, a first transmit module may be mounted to a right front portion of the participant, a second transmit module may be mounted to a front left portion of the participant, a third transmit module may be mounted to a back right portion of a participant, and a fourth transmit module may be mounted to a back left portion of the participant.

At block 1206, cables are provided to connect the controller to the plurality of transmit modules. The cables, such as cables 222, may be the same length to ensure simultaneous transmission of the UWB blink data pulses.

In an example embodiment, the cables 222 may be durable flexible cables. In some example embodiments, the cables may be within an impact absorbent material.

In an example embodiment, the cable length and/or component based signals delays of the respective transmit modules may be compensated for to ensure simultaneous transmission of the UWB blink data pulses to encourage reliable receipt of the UWB blink data pulses. In an instance in which the cable lengths and/or the component based signal delays have been determined and matched, microcontroller 204 of the controller 200 may be configured to trigger the respective transmit modules 300 to transmit the UWB blink data pulses at the same time. The matched cable lengths and/or component based signal delays will cause the UWB blink data pulse transmissions to be simultaneous or substantially simultaneous. In an instance in which the cable lengths or component delays are not matched, the microcontroller 204 of the controller 200 may be configured to trigger the respective transmit modules 300 to transmit the UWB blink data pulses at different times to compensate of the differences in transmission due to cable length and component based signal delays. The controller 200 triggering the transmission of the UWB blink data pulses at different times based on signal delays may cause the UWB blink data pulse transmissions to be simultaneous or substantially simultaneous.

At block 1208, an environmental sensor, such as environmental sensor 210 is optionally provided which supplies environmental data to the microcontroller 204 of the controller 204. The microcontroller 204 may include the environmental data as a portion of the data packet.

In some embodiments, the microcontroller 204 may cause the tag to transmit blink data with a first environmental data value using a first blink data pulse rate, e.g. low, during a first time period, and transmit a second blink data with a second environmental data value using a second blink data pulse rate during a second time period. In some instances, the microcontroller may make the determination of blink data pulse rate based on comparing the environmental data to a predetermined threshold. For example, the microcontroller 204 may use a low blink date pulse rate in an instance in which an environmental sensor, such as an accelerometer, does not detect movement, e.g. environmental data value fails to satisfy a predetermined threshold, and a high blink data pulse rate in an instance in which the accelerometer detects movement, e.g. environmental data value satisfies the predetermined threshold.

Figure 13:
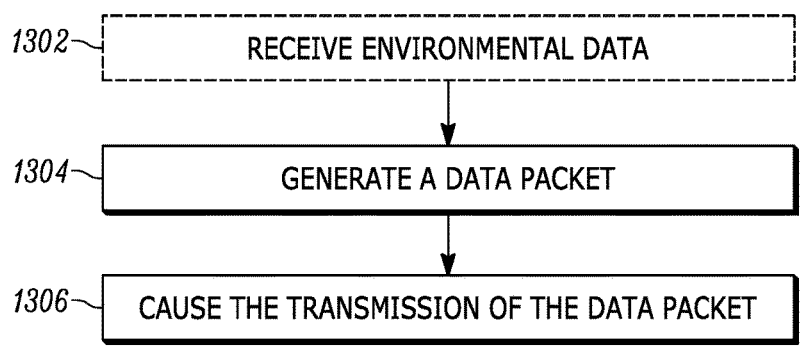
FIG. 13 illustrates a flowchart for a process for transmission of data packets from a modular location tag in accordance with some of the example embodiments of the present invention.

Additionally or alternatively, the environmental sensor may be a heart rate monitor, a humidity sensor, a temperature monitor, a moisture sensor, a breathing sensor, a global position sensor, a proximity sensor, or a pedometer Exemplary Process for Transmission of Data Packets from a Modular Location Tag FIG. 13 illustrates an exemplary process for transmission of data packets from a modular location tag. At block 1302, the modular location tag may have means, such as a controller 200, environmental sensor 210, or the like, configured to receive environmental data. The controller 200 may include a microcontroller 204 configured to receive the environmental data from the environmental sensor. The environmental sensor 210 may receive and/or detect environmental data. The environmental sensor 210 may be an accelerometer, a heart rate monitor, a humidity sensor, a temperature monitor, a moisture sensor, a breathing sensor, a global position sensor, a proximity sensor, or a pedometer. The environmental data may be stored to one or more registers associated with the microcontroller 204.

At block 1304, the modular location tag may have means, such as a controller 200, or the like, configured to generate a data packet. The microcontroller 204 of the controller 200 may store tag information, such as the tag UID, other identification information, a sequential burst count, stored tag data, or other desired information for object or personnel identification, inventory control, etc. in one or more registers. The microcontroller 204 may generate a data packet by reading one or more registers identified by a program code and transmit the data maintained in the registers to an output logic, such as logic 208, and/or the transmit modules, such as transmit modules 200.

In an instance in which the environmental data is transmitted as a portion of the data packet, the microcontroller 204 may read the environmental data stored in one or more registers and transmit the environmental data to the logic 208 and/or the transmit modules 300. The data packet may include the tag information and environmental data.

The controller, such as controller 200, and two or more transmit modules, such as transmit modules 300 may be mounted to portions of the participant. For example, a first transmit module may be mounted to a front of the participant and a second transmit module may be mounted to a back of the participant. In another example, a first transmit module may be mounted to a right front portion of the participant, a second transmit module may be mounted to a front left portion of the participant, a third transmit module may be mounted to a back right portion of a participant, and a fourth transmit module may be mounted to a back left portion of the participant.

At block 1306, the modular location tag may have means, such as a controller 200, transmit modules 300, or the like, configured to cause the transmission of the data packet. The controller 200 may cause two or more transmit modules 300 to simultaneously or substantially simultaneously, (e.g., less than 1 nsec variation between transmit modules 300), transmit the data packet in UWB blink data pulses to encourage reliable receipt of the blink data at the respective receivers.

In an example embodiment, the cable length and/or component based signals delays of the respective transmit modules may be compensated for to ensure simultaneous transmission of the UWB blink data pulses to encourage reliable receipt of the blink data at the respective receivers. In an instance in which the cable lengths and/or the component based signal delays have been determined and matched, microcontroller 204 of the controller 200 may be configured to trigger the respective transmit modules 300 to transmit the UWB blink data pulses at the same time. The matched cable lengths and/or component based signal delays will cause the UWB blink data pulse transmissions to be simultaneous or substantially simultaneous. In an instance in which the cable lengths or component delays are not matched, the microcontroller 204 of the controller 200 may be configured to trigger the respective transmit modules 300 to transmit the UWB blink data pulses at different times to compensate of the differences in transmission due to cable length and component based signal delays. The controller 200 triggering the transmission of the UWB blink data pulses at different times based on signal delays may cause the UWB blink data pulse transmissions to be simultaneous or substantially simultaneous.

In some embodiments, the microcontroller 204 may use a first blink data pulse rate, e.g. low rate, at a first time with a first environmental data value, and a second blink data pulse rate, e.g. high rate, at a second time with a second environmental data value. In some instances, the microcontroller 204 may make the determination of blink data pulse rate based on comparing the environmental data to a predetermined threshold. For example, the microcontroller 204 may use a low blink date pulse rate in an instance in which an environmental sensor, such as an accelerometer, does not detect movement, e.g., environmental data value fails to satisfy a predetermined threshold, and a high blink data pulse rate in an instance in which the accelerometer detects movement, e.g., environmental data value satisfies the predetermined threshold.

Simultaneous transmission from the transmit modules of the modular location tag, in an instance in which the receiver central processor/hub is configured to use the first arrival of a location RFID tag for location calculations, may provide more accurate tag locations, since there is a greater likelihood of a clear line of sight between at least one transmit module and a respective receiver. Further, reflected RFID transmission may be excluded from the tag location calculation.

In some embodiments, certain ones of the operations above may be modified or further amplified as described below. Moreover, in some embodiments additional optional operations may also be included. It should be appreciated that each of the modifications, optional additions, or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    generating, by a controller, a data packet; and
    causing the transmission of the data packet on blink data pulses from two or more individual transmit modules, wherein each individual transmit module comprises an antenna and a pulse generator configured to transmit the data packet and is in data communication with the controller, wherein the controller causes substantially simultaneous transmission of the blink data pulses from the respective transmit modules to encourage reliable receipt of the blink data pulses at one or more of a plurality of receivers.

2. The method of claim 1, wherein cables which define a common length provide data communication between the two or more individual transmit modules and the controller.

3. The method of claim 2, wherein each of the cables is disposed within an impact absorbent material.

4. The method of claim 2, wherein each of the cables comprises a plurality of flexible cables.

5. The method of claim 1, wherein component based signal delays of the two or more individual transmit modules are matched, and wherein the substantially simultaneous transmission of the blink data pulses is based at least in part on the matched component based signal delays.

6. The method of claim 1, wherein the controller is configured to trigger the transmission of the blink data pulses based on component based signal delays associated with the respective individual transmit modules, and wherein the substantially simultaneous transmission of the blink data pulses is based at least in part on the triggering of the transmission of the blink data pulses.

7. The method of claim 1, wherein the controller or the two or more individual transmit modules are encased in an impact resistant enclosure.

8. The method of claim 1, wherein the controller and the two or more individual transmit modules are configured to be mounted to a participant defining a front and back, wherein a first transmit module of the two or more individual transmit modules is configured to be mounted to the front the participant and a second transmit module of the two or more individual transmit modules is configured to be mounted to the back of the participant.

9. The method of claim 1, wherein the controller and the two or more individual transmit modules are configured to be mounted to a participant defining a front and back, wherein a first transmit module of the two or more individual transmit modules is configured to be mounted to a right front portion of the participant, a second transmit module of the individual transmits modules is configured to be mounted to a front left portion of the participant, a third transmit module of the two or more individual transmit modules is configured to be mounted to a back right portion of a participant, and a fourth transmit module of the individual transmit modules is configured to be mounted to a back left portion of the participant.

10. The method of claim 1, wherein the controller and the two or more individual transmit modules are incorporated into a participant protective equipment.

11. The method of claim 1, wherein the controller and the two or more individual transmit modules are incorporated into a participant clothing.

12. The method of claim 1, wherein the controller is configured to be mounted to a participant belt.

13. The method of claim 1 further comprising receiving environmental data from an environmental sensor.

14. The method of claim 13, wherein the environmental sensor is an accelerometer.

15. The method of claim 14, wherein the controller drives the substantially simultaneous transmission of the blink data pulses at a first blink data rate based on the accelerometer outputting accelerometer data in a first value range and at a second blink data rate based on the accelerometer outputting accelerometer data in a second value range.

16. The method of claim 13, wherein the environmental sensor is at least one of a heart rate monitor, a humidity sensor, a temperature monitor, a moisture sensor, a breathing sensor, a global position sensor, a proximity sensor, or a pedometer.

17. The method of claim 13 further comprising including, by the controller, the environmental data in the data packet to be transmitted from the two or more individual transmit modules.

18. The method of claim 1, wherein the blink data pulses comprise ultra-wideband blink data pulses.

19. The method of claim 1 further comprising providing electrical power to the controller form a power supply.

* * * * *